Sept. 16, 1952  D. E. NORGAARD  2,611,036
SELECTIVE SIDEBAND TRANSMISSION AND RECEPTION SYSTEM
Filed Nov. 12, 1947  4 Sheets-Sheet 1
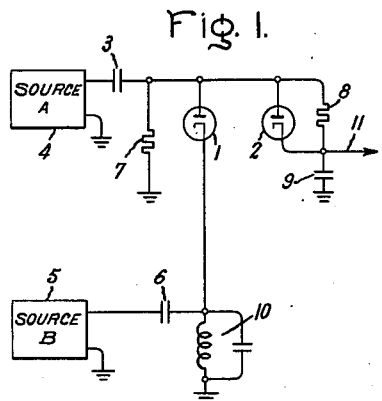
Fig. 1.
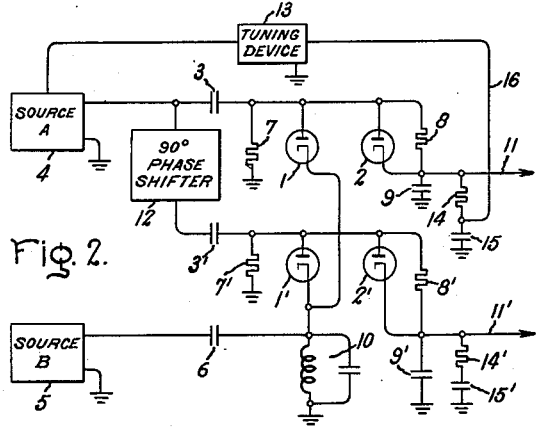
Fig. 2.
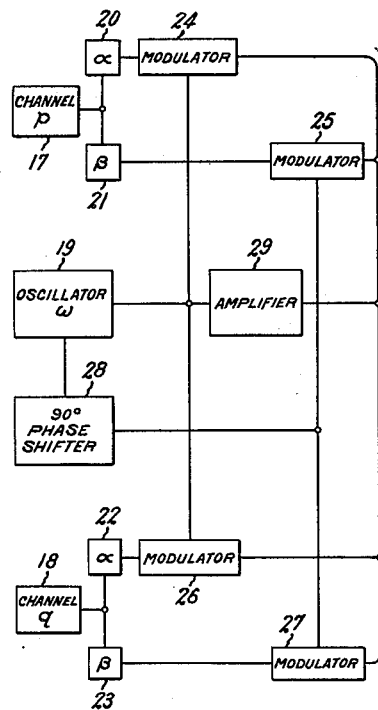
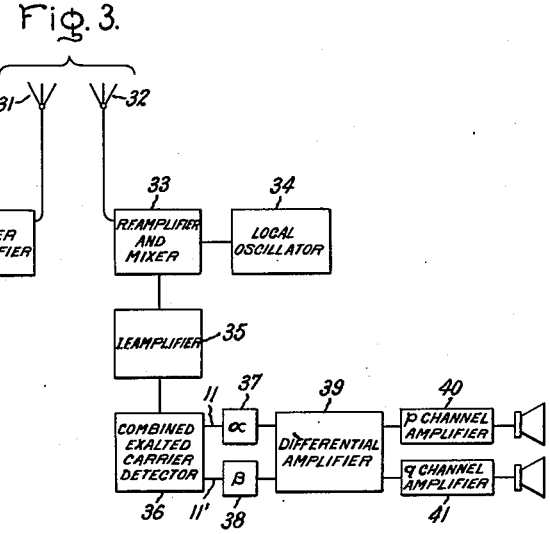
Fig. 3.
Fig. 4.
Inventor:
Donald E. Norgaard,
by Merton D Morse
His Attorney.

Sept. 16, 1952  D. E. NORGAARD  2,611,036
SELECTIVE SIDEBAND TRANSMISSION AND RECEPTION SYSTEM
Filed Nov. 12, 1947  4 Sheets-Sheet 2
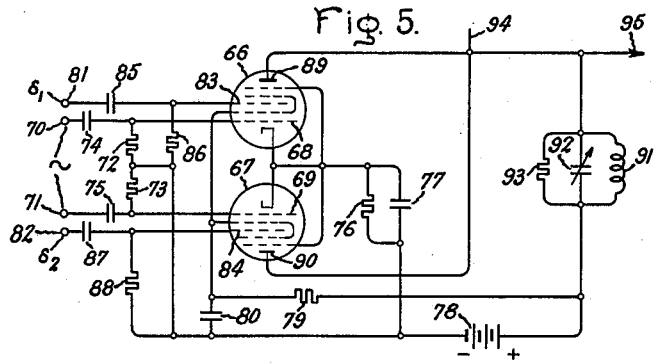
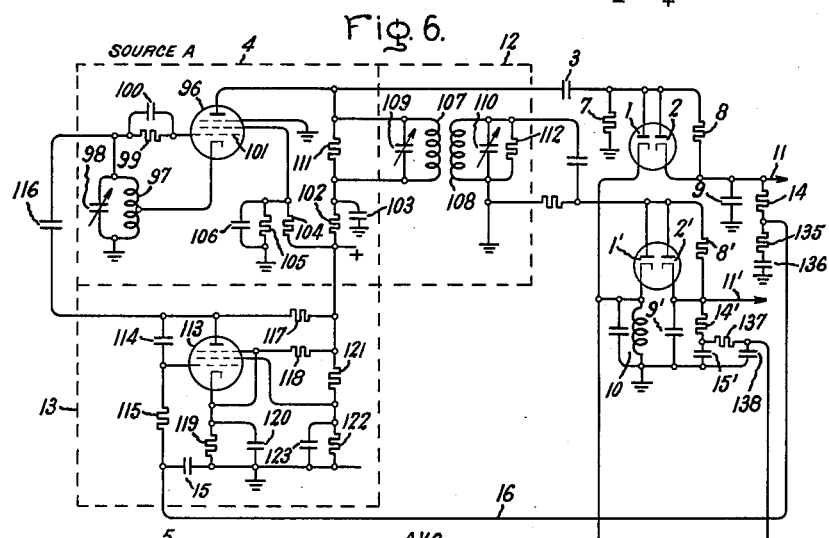
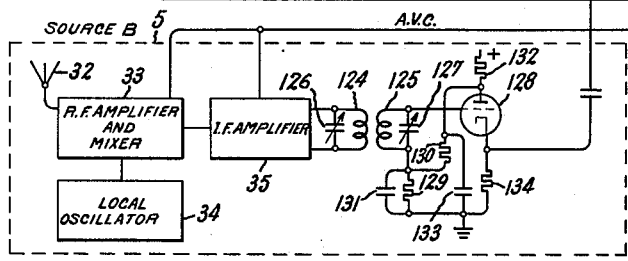
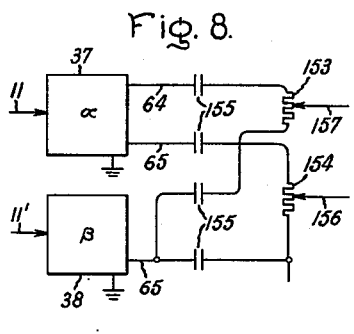
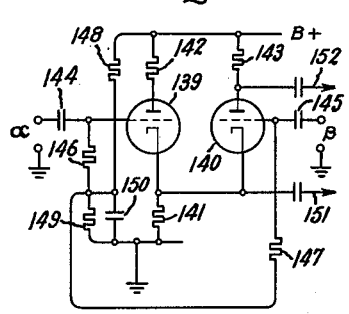
Inventor:
Donald E. Norgaard,
by Merton D Morse
His Attorney.

Sept. 16, 1952     D. E. NORGAARD     2,611,036
SELECTIVE SIDEBAND TRANSMISSION AND RECEPTION SYSTEM
Filed Nov. 12, 1947     4 Sheets-Sheet 3
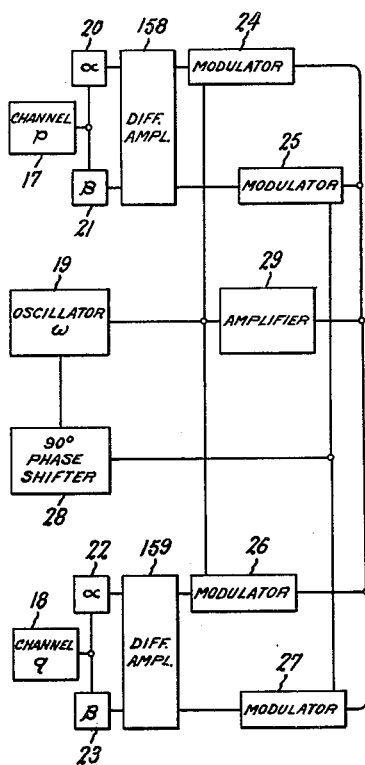
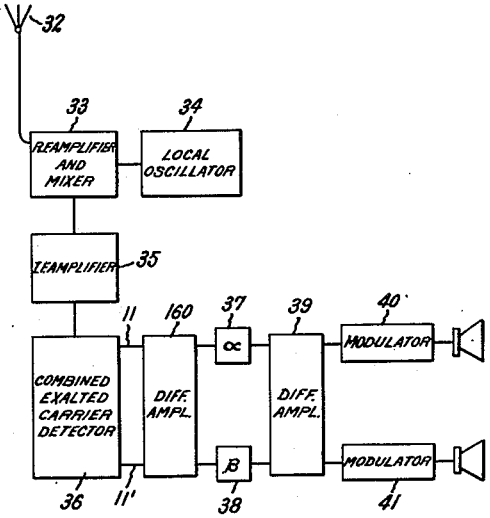
Fig. 9.
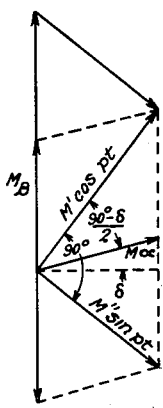
Fig. 10.
Inventor:
Donald E. Norgaard,
by Merton D Moore
His Attorney.

Sept. 16, 1952            D. E. NORGAARD           2,611,036
SELECTIVE SIDEBAND TRANSMISSION AND RECEPTION SYSTEM
Filed Nov. 12, 1947                          4 Sheets-Sheet 4
Fig. 11.
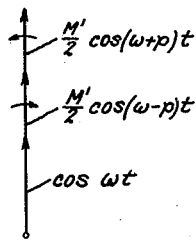
Fig. 12.
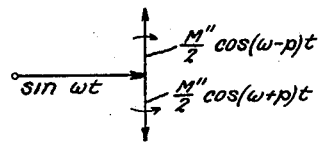
Fig. 13.
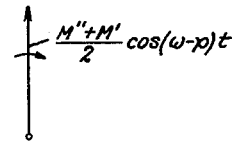
Fig. 14.
Fig. 15.
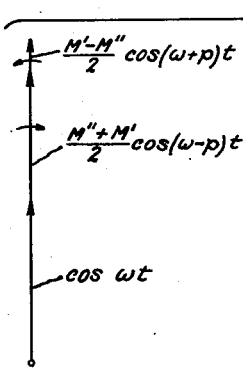 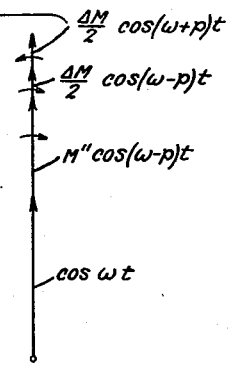
Inventor:
Donald E. Norgaard,
by Merton D Mowe
His Attorney.

UNITED STATES PATENT OFFICE 2,611,036

SELECTIVE SIDEBAND TRANSMISSION AND RECEPTION SYSTEM

Donald E. Norgaard, Scotia, N. Y., assignor to General Electric Company, a corporation of New York Application November 12, 1947, Serial No. 785,259

39 Claims. (Cl. 179—15)

My invention relates to communication systems and, more particularly, to a system of simultaneous single side-band modulation of a radio frequency carrier wave by two sources of intelligence and reception of the resulting composite signal with apparatus which separates the two intelligence sources and supplies them to different output circuits.

It is a primary object of my invention to provide a new and improved system for transmitting and receiving intelligence on two sidebands associated with a single carrier wave.

It is known that single sideband signals may be generated by combining two separate modulations of a carrier signal, one modulation being carried out on a signal of reference phase and the other on a carrier signal of the same frequency but having a phase displacement of 90° from the first signal. In an application for United States Letters Patent, Serial No. 662,665, filed by Robert B. Dome on April 17, 1946, and assigned to the assignee of this present invention, there is disclosed a system employing two electrical networks, each having an essentially logarithmic phase vs. frequency characteristic of transmission, which system permits the translation of a complex wave into two corresponding complex waves whose individual components can be made to have an approximately fixed phase relationship over any desired band of frequencies. Such a system is particularly well adapted for use in a single sideband transmission system to produce two audio frequency waves having components of the same magnitudes as the components of an input audio frequency signal, but a nearly constant phase relationship of any desired value between the corresponding components in the two output waves.

It is likewise known that different intelligence sources may be used to produce two separate sets of sidebands associated with a single carrier wave. Such systems, in the past, have employed in both the transmitters and receivers special band pass filters intricate in design and expensive in construction. It is a further object of my invention to provide a system of this type which requires no band pass filters, but instead employs relatively simple circuits in both the transmitting and receiving apparatus.

It is still another object of my invention to provide a new and improved communication system capable of multiplex transmission and reception of any two voice or entertainment channels and which requires no greater band width than either channel alone when a conventional double sideband transmission and reception system is employed.

It is still another object of my invention to provide a new and improved communication system for transmitting binaural sound, in which system a conventional radio receiver operates satisfactorily and in which a specially constructed receiver separates two intelligence channels employed in the transmitting system to produce binaural or biacoustical effects.

It is still another object of my invention to provide a new and improved receiver for use for single sideband reception of a double sideband transmission signalling system in which an interfering transmission channel on one side or the other of a desired signal may be eliminated from the output.

It is still another object of my invention to provide new and improved circuits for reducing the effects of selective fading in a communication system.

It is still another object of my invention to provide a new and improved exalted carrier detector circuit.

It is still another object of my invention to provide a new and improved radio receiver circuit capable of receiving conventional double sideband transmission signals in which improved reception is effected under adverse conditions of fading and interference.

It is a further object of my invention to provide a new and improved distortionless demodulation system which permits the use of simple audio frequency filter networks to obtain improvement in the effective selectivity of a radio receiver.

It is a still further object of my invention to provide a new and improved transmitting system in which a carrier wave may be modulated by one source to produce a single sideband on either side of the carrier wave or modulated by one source to produce a double sideband signal or doubly single sideband modulated by two sources, and in any of which the carrier wave may be suppressed or exalted to any desired degree. It is another object of my invention to provide a receiver for such a system capable of utilizing the transmitted signal to provide output signals corresponding to the modulating signals applied to the carrier wave at the transmitter.

It is still another object of my invention to provide a new and improved radio transmitting system in which the principal portion of the radiated energy is composed of useful intelligence carrying sidebands.

One of the features of my invention is the use of a transmission system which operates to permit simultaneous transmission of two different signals and to permit simultaneous output of one of the signals on a first pair of output terminals and of the other signal on a second pair of output terminals. In the transmitter, the respective signals are each passed through two electrical networks, which translate each of the modulating signals into two corresponding complex waves whose individual components have an approximately fixed phase relationship over the entire band of frequencies of the respective signals. The two complex waves formed from the respective signals are used to modulate respectively a first carrier wave of reference phase and a second carrier wave of the same frequency as the first wave but having a fixed phase displacement from the first wave of the same magnitude as that of the components of the two complex waves used to modulate the respective carriers. The respective modulated carrier waves thus formed from each of the signals are combined to form two sets of side bands located on opposite sides of the carrier wave and which may be radiated from any suitable antenna.

In the receiving system of my invention, the received wave is heterodyned with a locally generated carrier wave to produce a so-called intermediate frequency signal. The intermediate frequency signal is demodulated in an exalted carrier detector which provides two output signals comprising components of the two different signals, corresponding components in the two output signals being displaced in phase by a fixed amount. These output signals, in turn, are translated through two electrical networks which may be identical with those employed in the transmitter and a differential amplifier or equivalent balancing circuit in order to separate the two different signals and supply them to different output terminals.

When the signals thus translated are derived from different microphones, for example, exposed to the same sound source, binaural or biacoustical effects may be obtained by simultaneous reproduction of the two translated signals or selection of either one of the translated signals may be made to reproduce the sideband having the lesser amount of interference. Alternatively, the system may be used for transmitting and receiving two totally different signals with selective reproduction of either of the signals, or both signals simultaneously through separate output devices.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 is a circuit illustrating certain fundamental principles of an exalted carrier detector employed in the communication system of my invention; Fig. 2 is a modification of the detector circuit of Fig. 1; Fig. 3 is a block diagram of my system for selective sideband transmission and reception; Fig. 4 is a circuit diagram of the phase shift network employed in the system of Fig. 3; Fig. 5 is the diagram of a modulator circuit employed in the system of Fig. 3; Fig. 6 is the combined exalted carrier detector circuit employed in the receiver of the system of Fig. 3; and Figs. 7 and 8 are circuit diagrams of differential circuits suitable for use in the system of Fig. 3.

Fig. 9 is a block diagram showing a modification of the system of Fig. 3, and Figs. 10–15 are vector diagrams illustrating certain operational characteristics of the system of Fig. 9.

Referring to Fig. 1, I have there shown a basic schematic diagram of a detector or demodulator circuit which comprises a pair of diodes 1, 2 having their anodes connected together and coupled through a capacitor 3 to a source A of signals, designated by the rectangle marked with the legend 4. A second source B of signals, designated by the rectangle marked with the legend 5, is coupled by means of a capacitor 6 to the cathode of diode 1. A pair of resistances 7, 8 of equal value are connected, respectively, between the anode of diode 1 and a common point hereinafter referred to as ground and between the anode and cathode of diode 2. The cathode of diode 2 is likewise connected to ground through a capacitance 9 of such value that it has a low reactance and serves as a by-pass capacitor to signals of the frequency supplied by both sources A and B, but has a high reactance to low frequency signals occupying the frequency range from 0 to 15,000 cycles per second, for example. A tuned circuit 10 comprising an inductance and capacitance connected in parallel and resonant at the frequency of the signals of source B is connected between the cathode of diode 1 and ground. The circuit 10 has high impedance to the frequency of signals supplied by the source B and low impedance to signals of other frequencies including both the harmonics of the frequency of source B and unidirectional currents. Capacitor 6 is of such a value that it has low reactance to signals from source B. Likewise, the internal impedance of source B is low at frequencies in the range which includes the frequency of sources A and B. In some cases where the feedback of harmonics produced in the operation of the detector of Fig. 1 to preceding portions of the apparatus is very small, the capacitance of circuit 10 may be eliminated and desirable operation obtained by the use of only the inductance of this circuit.

When operating under condition such that source A applies a continuous signal to the anodes of diodes 1, 2 and source B applies no signal to the cathode of diode 1, the action of diodes 1 and 2 is such that capacitor 3 is charged negatively to a potential approximately equal to the positive peak value of the voltage of the wave applied by source A. Under these conditions, resistors 7, 8, together with capacitor 3, allow each of the diodes 1, 2 to act as peak rectifiers. Under such conditions, resistors 7 and 8 have unidirectional potential impressed on them equal approximately to the positive peak voltage of the wave of source A, together with the alternating potential of the wave of source A. One terminal of resistor 7 is grounded and the other is maintained at a potential which is the algebraic sum of a negative unidirectional potential equal to the positive peak voltage of the wave of source A plus the alternating potential of source A. The corresponding terminal of resistor 8 is maintained at this same potential, while the other terminal of resistor 8 operates at a zero unidirectional potential and zero alternating potential.

When a signal from source B is applied to the diodes at the same time as the signal from source A and the signals of the two sources are isochronous, that is, are of the same frequency and are in phase, the cathode of diode 1 varies its potential in phase with its anode. The effective result is to reduce the potential applied by source A across diode 1 by an amount equal to the potential of source B. Thus, the direct current flowing through resistor 7 is reduced by an amount corresponding to the peak voltage of the signal from source B. The direct current flowing in resistor 8, however, is unaffected by the application of signal from source B so that the potential of conductor 11 changes from zero to a positive potential equal to the peak voltage of the signal applied by source B. The same action is obtained if the connections of diodes 1 and 2 are reversed. If source B is adjusted to have the same frequency as source A, but is 180° out of phase with source A, a negative potential of the same magnitude is produced on conductor 11. The foregoing description of the action of the circuit of Fig. 1 holds true as long as the peak voltage of source B is materially smaller than that of source A.

Under conditions when source B is adjusted to have a frequency different from that of source A, the potential of conductor 11 varies at a rate equal to the difference between the frequencies of sources A and B, provided capacitors 3 and 9 have sufficiently high reactances to this difference frequency. This condition is realized when the frequency difference is a small percentage of the frequency of source A and when the potential of source B is materially smaller than that of source A.

If it is assumed that source A operates at a frequency of $$\frac{\omega_1}{2\pi}$$

and that source B contains two frequencies $$\frac{\omega_1}{2\pi}$$

and $$\frac{(\omega_1-p)}{2\pi}$$

where $\omega_1 = 2\pi$ times the frequency of the carrier wave of source A and $(\omega_1-p)$ is $2\pi$ times the frequency of the lower sideband produced by modulating a carrier wave of the frequency $$\frac{\omega_1}{2\pi}$$

with a signal of the frequency $$\frac{p}{2\pi}$$

(the method of obtaining such a signal is explained hereinafter) and that the two identical frequencies are isochronous, the potential of conductor 11 then comprises two principal components. One of these components is a unipotential component equal to the peak voltage of the component $$\frac{\omega_1}{2\pi}$$

of source B and the other component is a voltage having a frequency equal to the difference frequency $$\left(\frac{\omega_1}{2\pi}-\frac{\omega_1-p}{2\pi}\right)$$

or $$\frac{p}{2\pi}$$

The latter component has a peak voltage equal to that of the component frequency $$\frac{(\omega_1-p)}{2\pi}$$

of source B.

The foregoing process may be analyzed mathematically as follows: If source B contains two component frequencies $$\frac{\omega_1}{2\pi}$$

and $$\frac{\omega_1-p}{2\pi}$$

the voltage of source B is $$E_2 = E \cos \omega_1 t + EM \cos (\omega_1-p)t \quad (1)$$

where M may be called the modulation factor.

Equation 1 repersents a single sideband signal having a carrier frequency $$\frac{\omega_1}{2\pi}$$

and a modulating signal frequency $$\frac{p}{2\pi}$$

If source A, on the other hand, contains only one component frequency $$\frac{\omega_1}{2\pi}$$

in phase with that of source B, the voltage of source A, $E_1$, may be written:

$$E_1 = KE \cos \omega_1 t \quad (2)$$

If K is a numerical constant always much greater than unity, the output on conductor 11 of the detector circuit of Fig. 1 may be expressed as twice the product of the two signals divided by KE, or $$\frac{E_1 E_2}{KE}$$

Substituting the values for $2E_2$ and $E_1$ from Equations 1 and 2, $$\frac{2E_1 E_2}{KE} = 2E \cos \omega_1 t + EM \cos (\omega_1-p)t KE \frac{\cos \omega_1 t}{KE}$$

$$(3)$$

$$= E + E \cos 2\omega_1 t + EM \cos pt + EM \cos (2\omega_1-p)t$$

Since capacitor 9 is of such a value that it has low reactance to frequencies such as that from the source A, it has an even lower reactance to higher frequencies. Thus, the components $E \cos 2\omega_1 t$ and $EM \cos (2\omega_1-p)t$ of Equation 3 are virtually short-circuited by capacitor 9, while the components $E$ and $EM \cos pt$, being, respectively, unidirectional and low frequency components, are not affected by capacitor 9. The output of the detector, accordingly, may be written:

Detector output $= E + EM \cos pt$
$= E(1 + M \cos pt) \quad (4)$

This output corresponds to a modulating signal which may be of the form $(1 + M \cos pt)$. Since Equation 1 is the equation of a single sideband signal carrying the intelligence of the single tone of frequency $$\frac{p}{2\pi}$$

the foregoing analysis shows that such a single sideband signal may be demodulated substantially without distortion by the detector circuit of Fig. 1 provided $K \gg 1$.

It is apparent from the foregoing that the circuit of Fig. 1 operates to demodulate the wave of source B. This demodulation takes place whether or not source B contains any component of frequency $$\frac{\omega_1}{2\pi}$$

the only effect under such conditions being the omission from conductor 11 of the unidirectional component created by the presence of component frequency $$\frac{\omega_1}{2\pi}$$

of source B.

In the operation of the circuit of Fig. 1, the potential of source A is much greater than that of source B, so that electron current flows through diodes 1 and 2 only near the positive peaks of signal applied by source A. When the source B is adjusted to have the same frequency and to be 90° out of phase with source A, current flows through diodes 1 and 2 during only a short portion of each cycle of the wave from source A, conduction occurring only when the cathode of diode 1 is near zero potential. Thus, a component of the signal present in source B having the same frequency as the signal of source A does not affect the potential of the conductor 11 as long as that component in source B is 90° out of phase with that from source A. The potential of conductor 11 is affected, however, by any change in the phase relationship between the signals of like frequency in the two sources A and B, the two 90° points being specific cases where the detector output is zero. If, for example, source B contains a component having the same frequency as source A and the phase of this component in source B is altered from its 90° point with respect to the wave provided by source A in such a manner that the cathode of diode 1 is positive with respect to ground at the instant source A causes diodes 1 and 2 to conduct current, the unidirectional potential on conductor 11 shifts from zero to a value corresponding to the product of the magnitude of that component of the wave supplied by source B and the sine of the angular shift from the null or 90° point.

From the foregoing, if source A applies a signal $KE \cos \omega_1 t$ to the anodes of the diodes in the detector circuit of Fig. 1 and source B applies only a signal $E \sin (\omega_1 t \pm \Delta)$ to the cathode of device 1, the resulting potential on conductor 11 is $$E \sin (\pm \Delta) = \pm E \sin \Delta \quad (5)$$

where $\Delta$ is the phase displacement of the source B from the 90° phase relationship originally considered.

The foregoing analysis also indicated the manner in which the circuit of Fig. 1 operates to produce a signal having a frequency equal to the difference frequency between sources A and B when the sources are not synchronous. This difference frequency wave is sinusoidal if the wave form of source B is sinusoidal and of a frequency different from that of source A. Such a combination of waves might be encountered, for example, if the circuit were used in telegraphy or Teletype systems or for purpose of speech inversion. In such systems, the source A usually would not be of the same frequency as the source B. Likewise, in the foregoing, while the wave of the source A has been described as an unmodulated wave, this wave may have a low percentage of modulation, such as the ripple encountered in any normal filtering arrangement, without affecting adversely the operation of that circuit. Under any circumstances, however, the wave form of the difference frequency is the same as that of source B so long as the voltage of source B is materially less than that of source A.

In Fig. 2 I have shown a modification of the circuit of Fig. 1 in which two properly interconnected detector circuits of the type shown in Fig. 1 are employed to develop a control voltage in one of the detector circuits automatically to adjust the frequency and phase of one of the sources so that a condition of isochronism is maintained automatically at the other detector over a limited frequency range. Since the two detector circuits may be identical, component elements of the second circuit corresponding to those of the first are indicated by reference numerals which are primed.

In order to shift the phase of the signals supplied by source A to detector 1 by 90° before applying it to diodes 1' and 2', I provide a 90° phase shift network 12 which is interposed between source A and the coupling capacitor 3'. As is pointed out later, the network 12 operates to maintain a 90° phase relationship between the two signals applied from source A to the two detectors over only a small frequency range. Source B of Fig. 2 may be identical with the source B of Fig. 1. It is directly connected to the cathodes of detector diodes 1, 1' so that identically the same signal is applied by source B to the two detectors.

I also provide means to adjust the frequency of source A over a narrow range in accordance with a control potential developed at the output terminals of the detector employing diodes 1 and 2. This means comprises an electronic reactance circuit or equivalent tuning device 13 connected between source A and an output terminal of a low pass filter comprising resistor 14 and capacitor 15. As pointed out previously, the unidirectional potential on output terminal 11 is a function of the phase angle between the signal from source A and a corresponding component of source B synchronous with the signal present in source A. Thus, the unidirectional potential on conductor 16 connected between the low pass filter and tuning device 13 is the same as that of conductor 11, there being no possibility of unidirectional potential on this conductor unless sources A and B have components that are synchronous. The frequency of source A is a function of the potential of conductor 16 so that the loop circuit comprising source A, diodes 1 and 2, resistor 14, capacitor 15, and tuning device 13 may be made to operate in such a manner that the phase of the signal generated by source A is substantially 90° displaced from that of a component of the signal from source B within the range of frequencies throughout which tuning device 13 controls the frequency of source A in accordance with the potential on conductor 16. The deviation from 90° phase relationship between sources A and B may be made very small by choosing a value of E in Equation 5 and a control sensitivity for tuning device 13 such that the angle Δ of Equation 5 is essentially zero for a range of several kilocycles in the frequency of either source A or source B.

The values of the low pass filter elements 14, 15 are so chosen that this filter permits only gradual changes of potential on conductor 16 despite the instantaneous magnitude of voltage on conductor 11. The voltage across capacitor 15 may be considered as the average of the voltage on conductor 11, this average being taken over a period sufficiently long to make the frequency of source A unresponsive to audio frequency signals which may appear on conductor 11, but controllable nevertheless by the relatively long-time average of the potential on conductor 11.

Source A may be considered as a locally generated carrier signal whose phase is definitely related to a component of the signal which may be present in the source B. An important factor in the operation of a receiver employing the detector circuit of Fig. 2 is the operation of the tuning device 13 to maintain automatically a desired relationship between the frequency and phase of source A and that of a selected component of the signal supplied by source B. When the phase of the signal from source A appearing at its output terminal is displaced by 90° from the phase of a signal appearing at the output terminal of source B, then the signal at the output of the 90° phase shifter 12 is either in phase or 180° out of phase with the signal supplied by source B. Either phase relationship may be obtained simply by using the phase shifter 12 either to advance or retard by 90° the phase of the signal supplied to diodes 1' and 2' by source A, depending on the signal conditions desired at the anodes of diodes 1', 2'. Of course, once a particular relationship is chosen, the phase relationship between the signals applied to the four diodes 1, 2, 1', 2' remains fixed as long as source A remains synchronized with source B through the action of tuning device 13.

A double sideband signal applied to the cathodes of devices 1, 1' by the source B may be written:

$$E \cos \omega t + \frac{EM}{2}[\cos(\omega-p)t + \cos(\omega+p)t] \quad (6)$$

Since, through the action of tuning device 13, source A is maintained at 90° phase relationship with respect to the carrier component $E \cos \omega t$, the signal at the output terminal of source A is $E_1 \sin \omega t$, where $E_1$ is the peak voltage of source A, $\omega$ is $2\pi \times$ carrier frequency, and $p$ is $2\pi \times$ modulation frequency. The signal applied to the anodes of diodes 1', 2', through the action of the 90° phase shifter 12 is then $E_1 \cos \omega t$.

The detector output on conductor 11 is:

$$2\left[E \cos \omega t + \frac{EM}{2}[\cos(\omega-p)t + \cos(\omega+p)t]\right]\sin \omega t \quad (7)$$

When expanded, this becomes:

$$= E \sin 2\omega t + \frac{EM}{2}\left[\sin(2\omega-p)t + \sin(2\omega+p)t\right] \quad (8)$$

If only low frequency terms are considered, it is apparent that this output has a value of zero.

In contrast, the output of the detector on conductor 11' is:

$$2\left[E \cos \omega t + \frac{EM}{2}[\cos(\omega-p)t + \cos(\omega+p)t]\right]\cos \omega t \quad (9)$$

When expanded, this becomes:

$$= E[\cos 2\omega t + 1] + \frac{EM}{2}[\cos(2\omega-p)t + \cos pt + \cos(2\omega+p)t + \cos pt] \quad (10)$$

If only low frequency terms are considered, the detector output is:

$$= E + EM \cos pt \quad (11)$$
$$= E(1 + M \cos pt)$$

The term E in Equation 11 is the unidirectional potential proportional to the carrier strength E and the term $EM \cos pt$ is the demodulated double sideband intelligence of Equation 6. The foregoing analysis shows that no signal exists on conductor 11 and that a signal proportional to an initial signal of modulation $(1 + M \cos pt)$ is present on conductor 11'.

When the output signal supplied by source B to the cathodes of devices 1, 1' is a single sideband modulation for the lower sideband associated with the carrier wave, the equation for such a signal may be:

$$= \sqrt{2E} \sin(\omega t + 45°) + EM \cos(\omega-p)t \quad (12)$$

When source A is synchronized with the component frequency $$\frac{\omega}{2\pi}$$

of source B, the signal supplied to the 90° phase shifter 12 is:

$$E_1 \sin(\omega t - 45°) \quad (13)$$

due to the fact that source A lags the signal from source B by 90°. Under such conditions, the signal impressed on the anodes of diodes 1', 2' is $$E_1 \sin(\omega t + 45°) \quad (14)$$

The resultant signal on conductor 11 is:

$$2[\sqrt{2E} \sin(\omega t + 45°) + EM \cos(\omega-p)t \sin(\omega t - 45°)] \quad (15)$$

When this expression is expanded and only low frequency terms considered, it becomes:

$$\sqrt{2E} + EM \sin(pt + 45°) \quad (18)$$

$$\sqrt{2E} \cos 90° + EM \sin(pt - 45°) = EM \sin(pt - 45°) \quad (16)$$

The signal on conductor 11' for this condition is:

$$2[\sqrt{2E} \sin(\omega t + 45°) + EM \cos(\omega-p)t \sin(\omega t + 45°)] \quad (17)$$

When this expression is expanded and only low frequency terms considered, expression 17 becomes:

$$\sqrt{2E} + EM \sin(pt + 45°) \quad (18)$$

It may be noted from the foregoing that the demodulated intelligence appearing on conductor 11 has a 90° lagging phase relationship with that on conductor 11'. This follows from the fact that the potentials supplied respectively to the anodes of diodes 1, 2, and the anodes of diodes 1', 2' were displaced in phase by 90°. Concerning the action of the detector circuit of Fig. 2, it may be stated generally that in the demodulation of a single sideband signal by means of two circuits supplied with carrier signals having relative phase displacement, the demodulated output signals from the two circuits have the same relative phase displacement.

The detector circuit of Fig. 2 may be employed likewise to demodulate a signal modulated with two sources of intelligence, for example, sources $p$ and $q$, in such manner that intelligence $p$ is carried as lower sideband modulation and intelligence $q$ as upper sideband modulation. When source B is of this type, the expression for the signal on the cathodes of diodes 1, 1' may be $$E \sin \omega t + M_p[\cos (\omega-p)t] + M_q[\cos (\omega+q)t] \quad (19)$$

Due to the operation of the tuning device 13, the signal in the output of source A is $E_1 \cos t$, where the value of $E_1$ is made much greater than $E$. This signal is arbitrarily chosen to lead the carrier signal $E \sin \omega t$ of Equation 19 by 90°. In contrast, in Equation 13, the signal of source A was stated to lag that of source B by 90°. Either mode of operation may be used but, once a mode is chosen, due account of the fact must be taken in subsequent analysis.

Accordingly, through the action of 90° phase shifter 12, the signal applied to the anodes of diodes 1', 2' may be $E_1 \sin \omega t$. The demodulated output appearing on conductor 11 is:

$$2[E \sin \omega t + M_p[\cos (\omega-p)t] + M_q[\cos (\omega+q)t]] \cos \omega t \quad (20)$$

When only low frequency terms are considered, this becomes:

$$= M_p \cos pt + M_q \cos qt \quad (21)$$

It can be shown likewise that the demodulated output appearing on conductor 11' when considering low frequency terms only is:

$$E + M_p \sin pt - M_q \sin qt \quad (22)$$

The unidirectional component, $E$, may be disregarded, since it is normally separated from the intelligence bearing signals $p$ and $q$ by means of coupling networks in a well-known manner.

From the foregoing, it is seen that the demodulated intelligence $p$ on conductor 11 leads that on conductor 11' by 90°, while the demodulated intelligence $q$ on conductor 11 lags that on conductor 11' by 90°.

In accordance with my invention, the signals on conductor 11, when the detector is used for demodulation of a carrier wave modulated by two such sources of intelligence $p$ and $q$, may be supplied to one of a pair of networks of the type disclosed in the above-mentioned copending application, Serial No. 662,665, and the signals on conductor 11' may be supplied to the other network of the pair. The resultant signal at the output terminals of the first of such a pair of phase shift networks, which may be called an $\alpha$ network, is:

$$M_p \cos (pt+a_p) + M_q \cos (qt+a_q) \quad (23)$$

where $a_p$ is the phase shift at the frequency $$\frac{p}{2\pi}$$

and $a_q$ is the phase shift at the frequency $$\frac{q}{2\pi}$$

The signal at the output terminals of the second of such networks, which may be called a $\beta$ network, is:

$$M_p \sin (pt+a_p+90°) - M_q \sin (qt+a_q+90°) \quad (24)$$

where the second, or $\beta$ network, produces a shift in phase which is 90° more than that produced by the shift of the $\alpha$ network when operating at frequencies $$\frac{p}{2\pi}$$

and $$\frac{q}{2\pi}$$

The sum of the signals at the output terminals of the $\alpha$ and $\beta$ networks is:

$$M_p[\cos (pt+a_p) + \sin (pt+a_p+90°)] + M_q[\cos (qt+a_q) - \sin (qt+a_q+90°)]$$
$$= 2M_p \cos (pt+a_p) \quad (25)$$

The difference of the signals at the outputs of the $\alpha$ and $\beta$ networks is:

$$M_p[\cos (pt+a_p) - \sin (pt+a_p+90°)] + M_q[\cos (qt+a_q) - \sin (qt+a_q+90°)]$$
$$= 2M_q \cos (qt+a_q) \quad (26)$$

From the foregoing, it is apparent that the two detector systems comprising the respective pairs of diodes 1, 2 and 1', 2' and their associated apparatus shown in Fig. 2 respond to a double single sideband modulated carrier wave in such a manner that, when each supplies its output signal to a phase shift network system having the property of shifting phase in one portion thereof 90° more than in the other over a wide band of audio frequencies, the simple algebraic sum of the two circuits contains one of the modulating signals and the difference contains the other modulating signal. While, in the foregoing discussion, only two frequencies, $$\frac{p}{2\pi}$$

and $$\frac{q}{2\pi}$$

have been considered, the symbols $p$ and $q$ can each represent any composite intelligence. Thus, intelligence $p$ may be composed of any combination, such as $p_1, p_2, p_3, \ldots$ etc., where $p_1, p_2, p_3, \ldots$ etc. are the Fourier components of a complex wave. Likewise, intelligence $q$ may consist of Fourier components of a complex wave representing $q$. From the foregoing discussion, it is likewise evident that the demodulation circuit of Fig. 2 does not create intermodulation components, such as $(p_1-p_2), (p_1-p_3), \ldots$ etc. or $(p_1-q_1), (p_1+q_1), \ldots$ etc., none of which comprise the original intelligence of either modulating signal.

It will be shown from the description of the circuit of Fig. 3 to be given later that the intelligence derived by the circuit of Fig. 2 is that which is used in a transmitter for modulating the carrier wave to produce upper and lower sidebands. In systems where the sources A and B are not synchronous, it is of course necessary to remove the conductors 16 connected between the output circuit and the source A. Alternatively, if the connection comprising the conductor 16 and the tuning device 13 is made from the output terminal indicated to the source B and the source A comprises a crystal controlled oscillator, the circuit arrangement otherwise the same as Fig. 2 may be employed to control the frequency of the source B.

In Fig. 3, I have shown the block diagram of a complete system for simultaneous transmission and reception of two channels of intelligence $p$ and $q$ on a single carrier wave. In the circuit of Fig. 3, the rectangular block numbered 17 and bearing the legend "channel $p$" may represent a source of modulating intelligence which may occupy a band of frequencies from 30 to 10,000 cycles per second or greater, depending on the design of the $\alpha$ and $\beta$ networks employed. The block numbered 18 and bearing the legend "channel $q$" may represent another source of modulating intelligence which may be the same as channel $p$ or a totally different source. The oscillator 19 bearing the legend "$\omega$" may comprise any suitable source of carrier frequency, such as a crystal-controlled oscillator. The signals of channel $p$ are supplied to phase shifting networks 20, 21 labelled, respectively, $\alpha$ and $\beta$, and which may be of the type described in the above-mentioned copending application, Serial No. 662,665. The relationship between the networks 20, 21 is such that $\beta - \alpha = 90°$ for any modulating frequency between 30 and 10,000 cycles, where $\beta$ is the phase shift of the network 21, and $\alpha$ is the phase shift of the network 20. Similar $\alpha$ and $\beta$ networks 22, 23 are connected to the output of the source labelled channel $q$. In order to select the sideband for the modulating signal $q$ different from that selected for the modulating signal $p$, the output leads from 23 to modulator 27 are reversed so that in effect a polarity reversal is obtained without a corresponding time delay. This is desirable in event binaural signals are to be transmitted in separate sidebands in which case the time delays in passing from the modulating sources 17 and 18 through the respective phase shifting and modulator channels to the power amplifier are the same for corresponding frequency components. This insures that the relative phasing of the original binaural signals is retained for reproduction in a receiving system to be described shortly. The outputs of the networks 20, 21 are connected, respectively, to modulators 24 and 25, and the outputs of networks 22 and 23 are connected, respectively, to modulators 26, 27. Modulators 24 and 26 are supplied with carrier waves $\omega$ from the source 19, while modulators 25, 27 are supplied with carrier waves $\omega$ which have been displaced in phase by 90° through the action of a phase shifter 28. The outputs of modulators 24—27, together with the carrier wave $\omega$ amplified in an amplifier 29, are supplied to a power amplifier 30 which may comprise one or more stages of amplification at or around the carrier frequency of $$\frac{\omega}{2\pi}$$

The output of the power amplifier 30 may be supplied to a transmitting antenna 31 or any other suitable distribution system operating at the frequency $$\frac{\omega}{2\pi}$$

The receiver circuit of the system of Fig. 3 comprises an antenna 32 or any other suitable input device which couples a portion of the energy from the output of power amplifier 30 to the input of a radio frequency amplifier tuned to a frequency of $$\frac{\omega}{2\pi}$$

and mixer 33. In addition, there is supplied to the mixer portion of the device 33 a locally generated heterodyning wave derived from an oscillator 34. If the oscillations of oscillator 34 have a frequency differing from $$\frac{\omega}{2\pi}$$

by an amount $$\frac{\omega_1}{2\pi}$$

the output of the amplifier and mixer 33 consists (among others) of modulated signals having an intermediate carrier frequency of $$\frac{\omega_1}{2\pi}$$

Intermediate frequency signals, after amplification in an amplifier 35, are supplied to an exalted carrier detector 36 which may comprise, for example, the circuit of Fig. 2. Since the intermediate frequency amplifier 35 provides signal waves at the new carrier frequency $$\frac{\omega_1}{2\pi}$$

including upper and lower sidebands separately bearing intelligence of channels $p$ and $q$, in employing the circuit arrangement of Fig. 2 it becomes necessary that the source A shown in block 4 provides waves of a frequency $$\frac{\omega_1}{2\pi}$$

Thus block 36 of Fig. 3 includes the circuit arrangement of Fig. 2 wherein source B shown in block 5 comprises the output of the I. F. amplifier 35, and source A shown in block 4 comprises a source of local oscillations at a frequency of $$\frac{\omega_1}{2\pi}$$

The output conductors of detector 36, which are numbered, respectively, 11, 11', are connected to $\alpha$ and $\beta$ networks 37, 38 similar to the networks 20, 21 and 22, 23 employed in the transmitter. The output currents of the $\alpha$ and $\beta$ networks, in turn, are combined in a differential amplifier 39. Preferably, the differential amplifier is of the type having two outputs, one of which comprises the algebraic sum of its two input signals, and the other, the algebraic difference of its two input signals. The two outputs of the differential amplifier are connected, respectively, to amplifiers 40, 41. Amplifier 40 may be an audio amplifier for the channel $p$, and amplifier 41, for the channel $q$. At the output terminals of the amplifiers 40, 41 appear, respectively, intelligence $p$ and intelligence $q$.

In the operation of the system of Fig. 3, simultaneous transmission of intelligences $p$ and $q$ is effective to permit simultaneous output of intelligence $p$ on one pair of output terminals and $q$ on a second pair of output terminals, provided the relationships of the various signals required by the Expressions 19 and 23—26 are observed. In the transmitter of this system, these relationships are observed if the $\alpha$ and $\beta$ networks maintain exactly 90° phase relationship over any desired range of modulation frequencies in transmitting the signal described by Expression 19 and if an exactly 90° phase relationship is maintained between the carrier signals obtained from the output of the oscillator 19 and the 90° phase shifter 28. It is further required that the amplification and transmission be carried out by perfectly linear transducing elements between the modulation stages 24—27 and the demodulation stage 36.

For optimum operation of the system in the receiver, it is desirable that the $\alpha$ and $\beta$ networks maintain an exactly 90° phase relationship over any desired range of intelligence frequency and are linear in their amplitude transfer characteristic. In the exalted carried detector 36 of the receiver, a fixed phase-relationship of 90° is desired for the locally generated oscillations of the source A with respect to the incoming carrier signal. To this end, the phase shifter 12 should provide an exactly 90° phase shift at all times. Finally, the circuits of the detectors comprising the diodes 1, 2 and 1', 2' preferably should have identical phase shift characteristics over the audio band of frequencies.

While none of the foregoing desirable conditions can be entirely satisfied in practice, I have found that the greatest difficulty is encountered in maintaining the exact 90° phase relationship of the $a$ and $\beta$ networks. While the performance of the receiver alone or the transmitter alone is governed largely by the characteristics of such $a$ and $\beta$ networks, I have found that it is possible to transmit an imperfect double single sideband signal and receive this signal on an imperfect receiver, provided certain specific relationships are maintained. In other words, I have found that it is not required that, in the transmitting system, all the sideband energy of a band of frequencies be confined entirely to one side or the other of the carrier frequency. I have likewise found that the receiver is not required to be responsive only to sideband energy on one side of the carrier wave, but may be responsive in a particular manner to sideband energy which lies on the other side of the carrier wave. An explanation of the operation of the overall communication system of Fig. 3, even when the $a$ and $\beta$ networks employed therein do not maintain an exact 90° phase relationship over their entire range of intelligence frequency may best be obtained from the following analysis.

If the intelligence $p$ comprises a sine wave having a frequency of $$\frac{p}{2\pi}$$

and intelligence $q$ likewise comprises a sine wave having a frequency of $$\frac{q}{2\pi}$$

where both intelligences are confined to a frequency range from 30 to 10,000 cycles, they may be expressed as the following functions of time:

Intelligence $p$: $M_p \sin(pt-a_p)$     (27)
Intelligence $q$: $M_q \sin(qt-a_q)$     (28)

where $M_p$ is the amplitude of the wave $p$; $M_q$ is the amplitude of the wave $q$; $t$ is the time in seconds; $a_p$ is the phase shift of the $a$ network at the frequency $$\frac{p}{2\pi}$$

and $a_q$ is the phase shift of the $a$ network at the frequency $$\frac{q}{2\pi}$$

Both the $a$ and $\beta$ networks may be constructed to have an amplitude vs. frequency response that is essentially flat and a phase characteristic that is approximately logarithmic. If expressions (27), (28) represent the input signals to the $a$ and $\beta$ networks 20—23 of the transmitter shown in Fig. 3, the output of the $a$ network 20 is:

$$M_p \sin(pt-a_p+a_p) = M_p \sin pt \quad (29)$$

and that of the $a$ network 22 is:

$$M_q \sin(qt-a_q+a_q) = M_q \sin qt \quad (30)$$

On the other hand, the output of the $\beta$ network 21 is:

$$M_p \sin(pt-a_p+\beta_p) = M_p \sin(pt-a_p+a_p+90°+\delta_p)$$
$$= M_p \sin(pt+90°+\delta_p)$$
$$= M_p \cos(pt+\delta_p) \quad (31)$$

where $\beta$ is the phase shift of the $\beta$ network at a frequency $$\frac{p}{2\pi}$$

and $\delta_p$ is defined by the equation:

$$\delta_p = \beta_p - a_p - 90° \quad (32)$$

In other words, $\delta_p$ is the deviation from the ideal 90° phase relationship assumed in former analysis.

Similarly, the output of network 23 is:

$$M_q \cos(qt+\delta_q) \quad (31a)$$

where $$\delta_q = \beta_q - a_q - 90° \quad (32a)$$

in the manner of Equation 32.

If modulator 24 is a balanced modulator supplied with push-pull signals of both carrier and modulating signal, the wave of its output current is described by the following equation:

$$\sin \omega t(1+M_p \sin pt) - \sin \omega t(1-M_p \sin pt)$$
$$= M_p[\cos(\omega-p)t - \cos(\omega+p)t] \quad (33)$$

Similarly, since $\sin(\omega t+90°) = \cos \omega t$, the output current of modulator 25 is:

$$\cos \omega t[1+M_p \cos(pt+\delta_p)]$$
$$-\cos \omega t[1-M_p \cos(pt+\delta_p)]$$
$$= M_p[\cos[(\omega-p)t-\delta_p]$$
$$+\cos[(\omega+p)t+\delta_p]] \quad (34)$$

The equation of the output current of modulator 26 is:

$$\sin \omega t(1+M_q \sin qt) - \sin \omega t(1-M_q \sin qt)$$
$$= M_q[\cos(\omega-q)t - \cos(\omega+q)t] \quad (35)$$

Similarly, it can be shown that the output current of modulator 27 is:

$$-M_q[\cos[(\omega-q)t-\delta_q]$$
$$+\cos[(\omega+q)t+\delta_q]] \quad (36)$$

The combined output of modulators 24–27 is the algebraic sum of Expressions 33 to 36. This combined output of the modulators is:

$$M_p[\cos(\omega-p)t+\cos[(\omega-p)t-\delta_p]]$$
$$+M_p[\cos[\omega+p)t+\delta_p]-\cos(\omega+p)t]$$
$$-M_q[\cos(\omega+q)t+\cos[(\omega+q)t+\delta_q]]$$
$$+M_q[\cos(\omega-q)t-\cos[(\omega-q)t-\delta_q]] \quad (37)$$

It is evident that, when $\delta_q=0$ and $\delta_p=0$, Expression 37 represents two perfect single sideband signals having the same carrier frequency, $$\frac{\omega}{2\pi}$$

intelligence $p$ being carried as the lower sideband and intelligence $q$ being carried as the upper. In Expression 37, intelligence $p$ is not confined wholly to the lower sideband nor is intelligence $q$ confined wholly to the upper sideband, except when $\delta_q=0$ or $\delta_p=0$, depending upon the signal considered.

The dependence of the ratio of the undesired to the desired sideband upon the error angle $\delta$ may be shown by the following considerations.

In the case of intelligence $p$, the desired sideband is:

$$M_p[\cos(\omega-p)t+\cos[(\omega-p)t-\delta_p)]] = 2M_p \cos\frac{\delta_p}{2} \cos\left[(\omega-p)t-\frac{\delta_p}{2}\right] \quad (38)$$

while the undesired sideband is:

$$M_p[\cos[(\omega+p)t+\delta_p]-\cos(\omega+p)t] = -2M_p \sin\frac{\delta_p}{2} \sin\left[(\omega+p)t+\frac{\delta_p}{2}\right] \quad (39)$$

The ratio of undesired to desired sideband is:

$$\frac{\sin\frac{\delta_p}{2}}{\cos\frac{\delta_p}{2}} = \tan\frac{\delta_p}{2} \quad (40)$$

In a similar manner for intelligence $q$:

$$\frac{\sin\frac{\delta_q}{2}}{\cos\frac{\delta_q}{2}} = \tan\frac{\delta_q}{2} \quad (41)$$

The ratios shown in Equations 40 and 41 indicate the performance of the transmitter alone, that is, the degree of perfection of the signals generated. The same ratios may be shown to hold true for the receiver alone and are a measure of the receiver performance or its ability to reject unwanted signals which occur in an unused sideband range.

The amplifier 30 of the transmitter system of Fig. 3 combines the signal output of the four modulators 24–27 with a carrier wave of desired strength supplied by amplifier 29. The complete composite signal supplied to the amplifier 30 is, therefore:

$$E_c \sin \omega t + M_p[\cos(\omega-p)t+\cos[(\omega-p)t-\delta_p]] \\ + M_p[\cos[(\omega+p)t+\delta_p]-\cos(\omega+p)t] \\ - M_q[\cos(\omega+q)t+\cos[(\omega+q)t+\delta_q]] \\ + M_q[\cos(\omega-q)t-\cos[(\omega-q)t-\delta_q]] \quad (42)$$

where $E_c$ is the amplitude of the carrier signal, and the other terms are as defined previously.

In the receiver, the complex signal of Equation 42 is converted in the amplifier mixer 33 by heterodyning with oscillations generated locally in oscillator 34 to produce an intermediate frequency wave. The equation of the intermediate frequency wave is the same as Equation 42 with the exception that $\omega_1$ is substituted for $\omega$, where $\omega_1$ is the intermediate frequency.

The circuit of the exalted carrier detector 36 is basically the same as that shown in Fig. 2. The source A of that detector comprises a second locally generated oscillation which is made synchronous with the carrier component of the incoming signal. From the previous explanation of the operation of the circuit of Fig. 2, it is evident that in the exalted carrier detector 36 the phase of the output signal of source A is displaced by 90° from that of the carrier signal $E_c \sin \omega_1 t$ supplied along with all other terms indicated in Equation 42 to the cathodes of diodes 1, 1', $\omega_1$ being the intermediate frequency. The output signal of source A, therefore, may be written:

$$KE_c \cos \omega_1 t \quad (43)$$

where $K \gg 1$ and $\Delta$ of Equation 5 is zero. The demodulation achieved by the diodes 1, 2 in the exalted carrier detector 36 provides an output signal on conductor 11 whose expression is:

$$E_c[\sin 2\omega_1 t + \sin 0] \\ + M_p[\cos(\omega_1-p+\omega_1)t+\cos(\omega_1-p-\omega_1)t \\ +\cos[(\omega_1-p+\omega_1)t-\delta_p] \\ +\cos[(\omega_1-p-\omega_1)t-\delta_p]] \\ + M_p[\cos[(\omega_1+p+\omega_1)t+\delta_p] \\ +\cos[(\omega_1+p-\omega_1)t+\delta_p] \\ -\cos(\omega_1+p+\omega_1)t-\cos(\omega_1+p-\omega_1)t] \\ - M_q[\cos(\omega_1+q+\omega_1)t+\cos(\omega_1+q-\omega_1)t \\ +\cos[(\omega_1+q+\omega_1)t+\delta_q] \\ +\cos[(\omega_1+q-\omega_1)t+\delta_q]] \\ + M_q[\cos(\omega_1-q+\omega_1)t+\cos(\omega_1-q-\omega_1)t \\ -\cos[(\omega_1-q+\omega_1)t-\delta_q]-\cos[(\omega_1-q-\omega_1)t-\delta_q]] \quad (44)$$

If only low frequency terms are considered, this becomes:

$$-E_c \sin 0 + M_p[\cos pt + \cos(pt+\delta_p) \\ +\cos(pt+\delta_p) - \cos pt] \\ + M_q[-\cos qt - \cos(qt+\delta_q) + \cos qt - \cos(qt+\delta_q)] \\ = 2M_p \cos(pt+\delta_p) - 2M_q \cos(qt+\delta_q) \quad (45)$$

Equation 45 shows the simple algebraic difference of signals proportional to the outputs of networks 21 and 23 of the transmitter. Each of the two components of the signal is proportional to the output of a respective one of the $\beta$ networks in the transmitter and appears on the output conductor 11 of the detector 36 of the receiver. In similar manner, demodulation by diodes 1', 2' of the detector 36 may be shown to produce the low frequency components on conductor 11' whose expression is:

$$E_c \cos 0° + M_p[\sin pt + \sin(pt+\delta_p) \\ -\sin(pt+\delta_p) + \sin pt] + M_q[\sin qt + \sin(qt+\delta_q) \\ -\sin(qt+\delta_q) + \sin qt] \\ = E_c + 2M_p[\sin pt] + 2M_q[\sin qt] \quad (46)$$

This output is the simple algebraic sum of the signals produced by the networks 20, 22 of the transmitter, namely, the algebraic sum of Equations 29 and 30. In the receiver the signals of Expressions 45 and 46 are supplied, respectively, to $\alpha$ and $\beta$ networks 37, 38, which networks are identical with those employed in the transmitter.

The signal applied to the $\alpha$ network 37 is subjected to a phase shift of $\alpha_p$ for a frequency of $$\frac{p}{2\pi}$$

and a phase shift or $\alpha_q$ for a frequency of $$\frac{q}{2\pi}$$

When the signal of Equation 45 is applied to such an $\alpha$ network, the output of the $\alpha$ network 37 is:

$$2M_p \cos(pt+\delta_p+\alpha_p) - 2M_q \cos(qt+\delta_q+\alpha_q) \quad (47)$$

A signal applied to a $\beta$ network is subjected to a phase shift of $\beta_p$ for a frequency $$\frac{p}{2\pi}$$

and to a phase shift $\beta_q$ for a frequency $$\frac{q}{2\pi}$$

Accordingly, when the signal of Equation 46 is applied to the $\beta$ network 38, the output of the network is:

$$2M_p \sin(pt+\beta_p) + 2M_q \sin(qt+\beta_q) \quad (48)$$

In this expression, the unidirectional term $$\frac{E_c}{2} \cos 0°$$

is neglected, since this term preferably is removed by filtering before the signal is applied to the $\beta$ network 38. When the values from Equations 32 and 32a for $\beta_p$ and $\beta_q$ in terms of $\alpha_p$ and $\alpha_q$, respectively, are substituted in Equation 48, this equation becomes:

$$2M_p \sin(pt+\alpha_p+90°+\delta_p)$$
$$+ 2M_q \sin(qt+\alpha_q+90°+\delta_q)$$
$$=2M_p \cos(pt+\alpha_p+\delta_p)+2M_q \cos(qt+\alpha_q+\delta_q) \quad (49)$$

In the receiver, the signals from the $\alpha$ and $\beta$ networks 37 and 38 are supplied to a differential amplifier 39 which, in turn, provides to amplifier 40 the sum of the two signals represented by Equations 47 and 49 and to amplifier 41, the difference of these two signals. Thus, the signal supplied to amplifier 40 is:

$$2M_p \cos(pt+\alpha_p+\delta_p)-2M_q \cos(qt+\alpha_q+\delta_q)$$
$$+2M_p \cos(pt+\alpha_p+\delta_p)+2M_q \cos(qt+\alpha_q+\delta_q)$$
$$=4M_p \cos(pt+\alpha_p+\delta_p) \quad (50)$$

Similarly, the signal supplied to amplifier 41 may be shown to be:

$$2M_p \cos(pt+\delta_p+\alpha_p)-2M_q \cos(qt+\delta_q+\alpha_q)$$
$$-2M_p \cos(pt+\alpha_p+\delta_p)-2M_q \cos(qt+\alpha_q+\delta_q)$$
$$=4M_q \cos(qt+\alpha_q+\delta_q) \quad (51)$$

These Expressions 50 and 51 show that, despite the imperfections in the $\alpha$ and $\beta$ networks, the imperfect transmission received on the receiver employing the imperfect $\alpha$ and $\beta$ networks may be used to give theoretically ideal separation between the intelligence channels $p$ and $q$.

If, on the other hand, the signals on conductor 11 of the detector 36 are supplied to a $\beta$ network, instead of an $\alpha$ network, and the signals on conductor 11' are supplied to an $\alpha$ network, instead of a $\beta$ network, the output of the $\alpha$ network under these conditions is:

$$2M_p \sin(pt+\alpha_p)+2M_q \sin(qt+\alpha_q) \quad (52)$$

where the unidirectional term $$\frac{E_c}{2}$$

is disregarded, and the output of the $\beta$ network is:

$$2M_p \cos(pt+\beta_p+\delta_p)-2M_q \cos(qt+\beta_q+\delta_q)$$
$$=2M_p \cos(pt+\alpha_p+90°+2\delta_p)$$
$$-2M_q \cos(qt+\alpha_q+90°+2\delta_q) \quad (53)$$

substituting the values of $\beta_p$ and $\beta_q$ in terms of $\alpha_p$ and $\alpha_q$. Since $\cos(A+90°)=-\sin A$, Equation 53 may be written:

$$-2M_p \sin(pt+\alpha_p+2\delta_p)+2M_q \sin(qt+\alpha_q+2\delta_q) \quad (54)$$

When the complex currents of Equations 52 and 54 are added in the differential amplifier 39, the output at one terminal of the amplifier is:

$$2M_p[\sin(pt+\alpha_p)-\sin(pt+\alpha_p+2\delta_p)]$$
$$+2M_q[\sin(qt+\alpha_q)+\sin(qt+\alpha_q+2\delta_q)]$$
$$-4M_p \cos(pt+\alpha_p+\delta_p) \sin \delta_p$$
$$+4M_q \sin(qt+\alpha_q+\delta_q) \cos \delta_q \quad (55)$$

Likewise, if these currents are subtracted, the output at the other terminal of the amplifier is:

$$2M_p[\sin(pt+\alpha_p)+\sin(pt+\alpha_p+2\delta_p)]$$
$$+2M_q[\sin(qt+\alpha_q)-\sin(qt+\alpha_q+2\delta_q)]$$
$$=4M_p \sin(pt+\alpha_p+\delta_p) \cos \delta_p$$
$$-4M_q \cos(qt+\alpha_q+\delta_q) \sin \delta_q \quad (56)$$

From the last two equations, it is seen that, if $\delta_q$ and $\delta_p$ are not zero or if the connections to the $\alpha$ and $\beta$ networks 37, 38 are not as shown in Fig. 3, neither signal is obtained separately from the other. The ratio of the undesired signal at respective outputs of the differential amplifier to the desired signal in such a case is, of course, proportional to the strength of the undesired signal, inversely proportional to the strength of the desired signal, proportional to $2 \sin \delta_{p,q}$, and inversely proportional to $2 \cos \delta_{q,p}$.

Referring now to the operation of the power amplifier 30 in the transmitter of Fig. 3, if this amplifier is considered to be a single stage high efficiency class "AB1" or class "AB2" amplifier having one tube operating within the range to satisfy the requirements of this type of operation, as an approximation the transfer characteristic of such an amplifier may be written:

$$\text{Output voltage} = i_p Z_L = K(e_g)^2 \quad (57)$$

where $i_p$ = the instantaneous plate current,
$Z_L$ = the plate load impedance,
$K$ = a constant for the tube used, and
$e_g$ = the instantaneous signal voltage applied.

The term $e_g$ normally is composed of the sum of a bias potential $C$ and signals to be amplified. If the signal to be amplified is one such as described by Equation 19, the signal applied to the grid is:

$$e_g = C + E \sin \omega t + M_p[\cos(\omega-p)t]$$
$$+ M_q[\cos(\omega+q)t]$$

The square of this expression is:

$$(e_g)^2 = C^2 + E^2 (\sin)^2 \omega t + (M_p)^2 (\cos)^2 (\omega-p)t$$
$$+ (M_q)^2 (\cos)^2 (\omega+q)t$$
$$+ 2CE \sin \omega t + M_p \cos(\omega-p)t + M_q \cos(\omega+q)t]$$
$$+ EM_p[\sin(2\omega-p)t + \sin pt]$$
$$+ EM_q[\sin(2\omega+q)t - \sin qt]$$
$$+ M_p M_q[\cos(2\omega-p+q)t + \cos(p+q)t] \quad (59)$$

When a filter is used to remove all frequencies other than those near $$\frac{\omega}{2\pi}$$

the output of such an amplifier becomes:

$$K(e_g)^2 = 2KC[E \sin \omega t + M_p \cos(\omega-p)t + M_q \cos(\omega+q)t] \quad (60)$$

or a replica of the original signal.

From the foregoing, it is apparent that an amplifier which permits linear amplification of a double sideband signal, also satisfactorily translates a double single sideband signal. This, of course, is true whether such an amplifier is used in the transmitter or receiver. One type of non-linearity, however, re-introduces the other, or unwanted, sideband. This non-linearity, which arises in amplitude limiting circuits, is equally undesirable for double sideband amplitude modulation signals. It is apparent, therefore, that in my improved communication system no greater restriction is placed upon the distortion permitted in an amplifier than is placed upon the same amplifier when used for translating conventional amplitude modulated signals.

From the foregoing discussion, it is apparent that my improved communication system may be made to give theoretically perfect separation of the channels of intelligence transmitted, even though the $\alpha$ and $\beta$ networks of the system do not maintain an exactly 90° phase relationship and the amplification and transmission are not carried out by perfectly linear impedance and transducing elements. On the other hand, it is well known that substantially constant 90° phase relationship may be maintained between a selected component of the signal B and the source A employed in my detector circuit. In normal operation, the carrier frequency of my transmitter is fixed and stable adjustment of the carrier phase may be provided. Accordingly, it is apparent that my communication system illustrated in Fig. 3 and described above is capable of operating satisfactorily to separate two different intelligence channels. I have found in practice that a separation between the two channels in the order of from 40 to 50 decibels may be maintained in this communication system.

One important application of the communication system of Fig. 3 arises when the channels p and q are microphones or other pickup devices which are exposed to the same sound field in a manner similar to the two ears of a human being. The resultant signal which is delivered to a radiating antenna 31 cannot be distinguished from a conventional double sideband signal by receivers of conventional design. A conventional receiver operates on such a signal as though the two microphones were mixed together and the resulting signal modulated in a carrier by conventional means. However, the improved receiving system of Fig. 3 is capable of resolving the information picked up by each microphone and supplying two different acoustical devices with corresponding signals. This is shown in Fig. 3 in which the respective channels 40 and 41 are illustrated as supplying their respective signals to different loudspeakers. When such dual transmission and reception is employed, binaural reception is obtained when headphones are used in place of the speakers. Similarly, biacoustic or stereophonic reproduction is obtained when loudspeakers are employed. In such a system, I have discovered that the binaural system imparts a degree of realism to any transmission which makes it difficult to distinguish sounds transmitted by the system from those of local origin and which do not pass through any artificial transmission means. Likewise, I have found that the biacoustic reproduction enhances the reproduction of sounds, the effect being largely dependent upon the acoustical conditions at the location of the reproducers. The binaural effect is quite striking and imparts to intelligence transmitted by such a system a realism never heretofore encountered by any artificial transmission means employing but one intelligence channel and which is obtained otherwise only when the listener is present in the locality of origin of the sounds or intelligence signals.

An important advantage of the communication system of the type shown in Fig. 3 is that it may be used for broadcasting binaural sound, while still permitting the conventional receivers now in existence to operate in a normal fashion. At the same time, the special receiver described operates to provide binaural or biacoustic reproduction with the added improvement of realism in the transmitted intelligence.

Another important advantage of my improved communication system is that two channels of intelligence, such as the channels p and q, may be transmitted and received without mutual interference. In such a closed system, moreover, it is not required to transmit an appreciable amount of carrier power, since the detector circuits of Fig. 2 function to provide substantially distortionless operation, even with zero transmitted carrier. As a result, the principal portion of the radiated energy in such a system is composed of useful intelligence bearing sidebands.

In a system of this type which transmits zero carrier wave, a high order of frequency stability is required in the receiver for the local oscillator 34 and the oscillation source A in the exalted carrier detector and in the transmitter for the carrier frequency. I have found, however, that, when the level of the carrier wave transmitted is approximately 10% of that normally employed in an amplitude modulated transmitter, reliable operation of the receiving circuits is insured, especially for the frequency and phase controlling device 13 of the detector circuit of Fig. 2. By the expression "carrier wave normally employed" is meant a carrier wave of such magnitude that the combined negative peaks of the modulating signals are never greater than the peak of the carrier. Thus, such a condition is obtained when a conventional carrier wave is modulated less than 100%, and a conventional receiver supposedly operates satisfactorily on such a signal. While the transmission of small amounts of carrier permits practically all the transmitted power to be used for intelligence carrying sidebands, receivers which are not provided with exalted carrier detectors are not capable of demodulating such a signal without distortion. For example, when two channels, such as channels p and q, are transmitted in too great a proportion with respect to the carrier, a conventional receiver combines these signals to produce distortion. In other words, when a small amount of carrier wave is transmitted, a double single sideband receiver is required to prevent distortion or intermodulation of the p and q channels. In such a case, my improved receiver causes substantially no distortion, permitting maximum utilization of practically all transmitted power.

In Fig. 4, I have shown typical α and β networks, such as the networks 20—23 employed in the transmitter of Fig. 3 and the networks 37, 38 employed in the receiver of that figure. The network of Fig. 4, which is one of those disclosed in the above-mentioned copending application, Serial No. 662,665, comprises an input terminal 42 to which is supplied audio frequency voltages from which are to be derived two output voltages characterized by the fact that the phase difference of the two output voltages at any frequency is maintained substantially constant at any desired angle, 90° being utilized in the circuit of Fig. 3, as the input signal is varied over a wide range of frequencies. The input voltages are illustrated as connected across a potentiometer 43 through a capacitor 44. A variable tap 45 on potentiometer 43 is connected to the input electrode of an electron discharge device 46. The cathode and anode of the device 46 are connected, respectively, to ground and a source of unidirectional potential indicated by the legend + through resistors 47, 48 having equal values of resistance. In the conventional phase inverter circuit thus far described, voltages of equal amplitude, but opposite polarity, are available with respect to ground at the anode and cathode, respectively, of the device 46.

A phase shifting network comprising capacitor 49 and resistor 50 is connected between the anode and cathode terminals of device 46 to provide a voltage shifted in phase with respect to the input terminal 42 which may be supplied directly to the control electrode of a second electron discharge device 51. Device 51 likewise has its anode and cathode connected, respectively, to positive operating potential and ground through matched resistances 52, 53 and has a phase-shifting network comprising capacitor 54 and resistance 55 connected between these electrodes.

In a similar manner, a third electron discharge device 56 has its anode connected to the positive operating potential through a resistance 57 and its cathode connected to ground through its resistance 58. A third phase-shifting network comprising capacitor 59 and resistance 60 is connected between the anode and cathode of device 56. At the output terminals of the circuits of each of the devices 46, 51, and 56, a successive shift in phase of the output potential with respect to the voltage at the input terminal 42 is obtained, the total number of such phase shifting stages depending upon the band width desired for the $\alpha$ or $\beta$ network. The output voltage of the device 56 is connected to the control electrode of a phase inverting electron discharge device 61. The anode of device 61 is connected to the source of positive potential through a resistor 62 and the cathode is connected to ground through a resistor 63, the resistance values of resistors 62, 63 being equal. Output terminals 64, 65, connected respectively to the anode and cathode of the device 61, provide two complex voltages of opposite polarity. When the product of the capacitor and resistance forming the phase shifting circuit of each stage has a definite predetermined ratio to the product of the capacitance and resistance of the phase shifting circuit of the next succeeding stage, the phase shift with frequency of the component wave varies approximately logarithmically.

While, in this phase shifting network, if it is desired to increase the bandwidth over which the network operates to maintain the above mentioned logarithmic phase characteristic, it is necessary only to add successive stages having components selected in the manner described, I have found that a bandwidth adequate for high quality speech and music is obtained by the use of but three stages of the circuit shown in Fig. 4. I have further found that the stages bearing the predetermined ratio of resistance-capacitance product may be arranged in any desired sequence and need not be successive stages as illustrated. In constructing an $\alpha$ or $\beta$ network in accordance with this circuit, each coupling stage must be well balanced by having the resistors 47 and 48, 52 and 53, and 57 and 58 matched to produce in each stage plate and cathode voltages which are equal in magnitude and of opposite polarity. Likewise, the resistor, such as resistor 48, connected between the anode and operating potential in each stage, is much smaller than the resistor of the corresponding phase shifting network, the resistor 50, for example. As an additional constructional detail of the network of Fig. 4, I have found that desirable operating characteristics are obtained when the time constants of the phase shifting networks of successive stages bear a ratio of approximately 10:1. Additionally, because of the unidirectional potential between a respective cathode and the control electrode of the succeeding tube, I have found that the cathode resistance of each stage should have a value which is equal to the number or order of the stage times the resistance of the cathode resistor of the first stage. Thus, resistor 58 in the third stage has a value of resistance which is three times the value of resistor 47 in the first stage.

While the circuit diagrams for the $\alpha$ and $\beta$ networks are the same, the values of the impedance components of these networks bear a fixed relation. That relation may best be obtained by a comparison of the following values of components found suitable for typical $\alpha$ and $\beta$ networks. For the $\alpha$ network:

$R_{47} = R_{48} = 1000$ ohms, balanced within 1%.

$R_{50}C_{49} = \dfrac{1}{2\pi \times 3000}$ seconds. ($R_{50} = 5 \times 10^4$ ohms.)

$R_{52} = R_{53} = 2R_{47} = 2000$ ohms, balanced within 1%.

$R_{55}C_{54} = \dfrac{1}{2\pi \times 300}$ seconds. ($R_{55} = 10^5$ ohms.)

$R_{57} = R_{58} = 3R_{47} = 3000$ ohms, balanced within 1%.

$R_{60}C_{59} = \dfrac{1}{2\pi \times 30}$ seconds. ($R_{60} = 5 \times 10^5$ ohms.)

$R_{62} = R_{63} = 4R_{47} = 4000$ ohms.

$R_{43}C_{44} = \dfrac{1}{10}$ seconds. (Depends on audio amplifier low frequency cutoff.)

Devices 46, 51 and 56, 59 are 6SL7 GT or 6SN7 GT type tubes.

For the $\beta$ network:

$R_{47} = R_{48} = 1000$ ohms, balanced within 1%.

$R_{50}C_{49} = \dfrac{1}{2\pi \times 10,800}$ seconds. ($R_{50} = 5 \times 10^4$ ohms.)

$R_{52} = R_{53} = 2000$ ohms, balanced within 1%.

$R_{55}C_{54} = \dfrac{1}{2\pi \times 1080}$ seconds. ($R_{55} = 10^5$ ohms.)

$R_{57} = R_{58} = 3000$ ohms, balanced within 1%.

$R_{60}C_{59} = \dfrac{1}{2\pi \times 108}$ seconds. ($R_{60} = 5 \times 10^5$ ohms.)

$R_{62} = R_{63} = 4000$ ohms.

The time constants of the product of resistor 43 and capacitor 44 in the $\alpha$ and $\beta$ networks are equal in order to insure proper relative phase of input signals.

Using the values of the components given above, I have found that the $\beta$ network provides a signal output approximately 90° earlier in time phase than does the $\alpha$ network when each network is supplied with the same signal across its input terminals. This relationship, moreover, holds with a variation of ±5° through a frequency range of 30 to 7000 cycles per second. While, in the circuit of Fig. 4, the signals available from the $\alpha$ and $\beta$ networks appear in push-pull form on conductors 64, 65, resistor 62 may be short-circuited or omitted to provide a single-ended output from the respective $\alpha$ or $\beta$ network.

The circuit of the respective modulators 24—27 employed in the communication system of Fig. 3 is shown in Fig. 5 of the drawings. This modulator circuit comprises a pair of pentagrid converter electron discharge devices 66, 67 having their cathodes connected together and signals of carrier wave frequency supplied in push-pull to the first control electrodes 68, 69 from input terminals 70, 71. The resistors 72, 73 and capacitors 74, 75 provide a coupling network to these control electrodes, while resistor 76, by-passed by capacitor 77 and having its ends connected respectively to the cathodes and the negative terminal of a battery 78 or any other suitable source of operating potential, serves to provide proper operating bias to the control electrodes 68, 69 of the device. Resistor 79, having one terminal connected to the positive terminal of battery 78 and by-passed to the negative terminal by a capacitor 80, provides a suitable value of operating potential to the screen electrodes, the second and fourth electrodes of device 66, 67.

Push-pull modulating signals from the corresponding one of the α or β networks 20—23 are supplied to terminals 81, 82 of the modulator circuit and to the respective third grids 83, 84 of devices 66, 67. I provide coupling networks comprising capacitor 85, resistance 86 and capacitor 87, resistance 88 for the input terminals 81, 82 and choose the values of the impedance elements of these networks to translate all frequencies in the desired audio frequency band with negligible phase shift and amplitude discrimination. In this respect, I have found it desirable that the products of capacitor 85, resistor 86 and capacitor 87, resistor 88 be made equal.

The anodes 89, 90 of the respective devices 86, 87 are connected together and to a resonant circuit comprising an inductance 91, a capacitance 92, and a resistance 93 connected in parallel. In this resonant circuit, which is tuned to the carrier frequency $$\frac{\omega}{2\pi}$$

resistance 93 is of a value chosen to provide sufficient band width to translate with negligible attenuation the sidebands corresponding to the highest frequency component of the modulating signals supplied to input terminals 81, 82.

The circuit of Fig. 5 may represent any of the modulation devices 24—27 of the system of Fig. 3. The anodes of the remaining modulator circuits may be connected to the tuned circuit comprising elements 91—93 through conductor 94 and the combined output of the modulators appears on the terminal 95.

It is apparent from the modulator circuit of Fig. 5 that the carrier signals applied on conductors 70, 71 may be balanced so that no carrier appears on conductor 95. However, as explained previously in connection with the discussion of the circuit of Fig. 3, the amplifier 29 may be adjusted to supply any desired phase and magnitude of the carrier wave. Thus, the amplifier 29 may be a pentode amplifier whose anode is connected in common with the anodes of the modulators 24—27 by means of the conductor 94 and whose control electrode is supplied with unmodulated carrier signal of desired phase from the oscillator 19. In this manner, the modulator circuit of Fig. 5 provides in its output a signal which may be represented by Equation 33 when the proper carrier wave and modulating signals are supplied, respectively, to terminals 70, 71 and 81, 82.

While, in Fig. 5, I have illustrated one form of modulator circuit, it is obvious that other circuits may be employed for the modulators 24—27, provided they operate in accordance with the overall requirements of my communication system to supply to the power amplifier 30 an output wave which may be expressed by Equation 42. Thus, for example, I have found that a combination of four modulators containing but one pentagrid tube each may be made to operate to meet the requirements of my system, provided the correct signals are supplied to these modulators. Such a simplified group of modulators, however, is not inherently balanced and difficulty may be experienced in adjusting the group to satisfy Equation 42 over a wide band of modulating frequencies.

In Fig. 6, I have shown a major portion of the receiver circuit of the system of Fig. 3, together with a detailed circuit diagram of the exalted carrier detector 36 of the receiver of Fig. 3. Fig. 6 gives certain circuit details of the arrangements shown in block form in Fig. 2 and elements of Fig. 6 corresponding to elements of Fig. 2 are identified by corresponding reference numerals.

In Fig. 6, the source of oscillations corresponding to the source A of Fig. 2 comprises a so-called electron coupled oscillator comprising an electron discharge device 96 and a frequency controlling or resonant circuit comprising an inductance 97 and an adjustable capacitance 98 having one terminal connected to the control electrode 101 of device 96 through a grid leak and condenser combination comprising resistor 99 and capacitor 100. The opposite terminal of the frequency controlling circuit 97, 98 is connected to ground and an intermediate point on the inductance 97 is connected to the cathode of device 96. Operating potential from the anode of the oscillator is provided from any suitable source indicated by the legend + which is connected to the anode through a decoupling network comprising resistor 102 and capacitor 103. Device 96 is provided with a stabilized screen voltage derived from a voltage divider comprising resistors 104 and 105, capacitor 106 by-passing the screen electrode to ground at the operating frequency of the oscillator.

The 90° phase shifter 12 comprises a tuned transformer having a primary winding 107 and a secondary winding 108, the primary winding being tuned by a capacitor 109 and the secondary by a capacitor 110. As is well known, such a tuned transformer has the property of producing a 90° phase shift between the primary and secondary voltages at its center frequency when both windings are properly tuned. Accordingly, by controlling the coupling between the windings of this transformer, the oscillations or carrier voltages from the local oscillator 96 appearing at the output terminal of the secondary winding 108 may be of the same magnitude as that of the input terminal of the primary winding 107, but displaced in phase therefrom by 90°. I provide loading resistors 111, 112 connected respectively across the primary and secondary windings to improve the performance of the exalted carrier detector circuit by extending the range over which the oscillator frequency may be allowed to vary. As a result, when the amount of loading furnished by the resistors 111, 112 is properly adjusted, slight mistuning of the receiver has less effect on the 90° phase shift obtained in the transformer. In general, when the values of resistors 111, 112 are small, the isolation or decoupling between the frequency controlling oscillator circuit 97, 98 and the phase shifting device 12 is increased and the amount of signal voltage available at the terminals of the windings 107, 108 is reduced.

The diodes 1, 2 are illustrated as being included in a single envelope and are coupled through capacitor 3 to the input terminal of primary winding 107 to improve the stability of the servo loop circuit controlling the phase of the signal applied to diodes 1 and 2 from the source A relative to the phase of the incoming signal from source B.

The tuning device 13 comprises an electron discharge device 113 having connected between its anode and cathode a phase shifting circuit comprising capacitor 114 and resistor 115, the control electrode of the device 113 being connected to the common terminal of the capacitor 114 and resistor 115. The anode of device 113 is coupled to the frequency controlling circuit 97, 98 through a capacitor 116 which functions both to couple the reactance generated by device 113 to this frequency controlling circuit and to provide signal from the circuit 97, 98 to the phase shifting circuit 114, 115. The signal applied from phase shifting circuit 114, 115 to the control electrode of device 113 is approximately 90° out of phase with that at the anode of device 113 and causes anode current to flow in such a manner as to make the impedance presented by the reactance device 13 to the frequency controlling circuit 97, 98 appear reactive. The amount of such reactance presented to the frequency controlling circuit of the source A by the reactance device 13 is controlled by the bias potential supplied to the control electrode of device 113 over conductor 16 connected to the common point of resistor 14 and capacitor 15. Operating potential for the anode of device 113 is supplied through plate resistor 117 from the source of potential indicated by the legend +.

A stabilized source of bias potential is supplied to the cathode of device 113 from a voltage divider circuit comprising resistors 118, 119 connected in series between the source of potential + and ground, the common point of these resistors being connected to the cathode of device 113 and capacitor 120, serving as a radio frequency bypass, being connected across resistance 119. A similar stabilized source of potential is provided for the screen electrode of device 113 by voltage dividing resistors 121, 122 connected in series between the source + and ground, the screen electrode being connected to the common point of these resistances and being by-passed to ground by capacitor 123. Alternatively, a conventional voltage regulator tube of the gaseous discharge type may be employed to stabilize the potential of the screen electrodes of devices 113 and 96.

The portion of the circuit of Fig. 6 which is labelled "source B" and corresponds to the rectangle bearing the numeral "5" in Fig. 2 comprises receiving antenna 32, radio receiving amplifier and mixer stage 33, the local oscillator 34, and the intermediate frequency amplifier 35. The output of the intermediate frequency amplifier is coupled to an intermediate frequency transformer comprising a primary winding 124 and a secondary winding 125, these windings being tuned respectively to the intermediate frequency $\omega_i$ by capacitors 126, 127. One terminal of secondary winding 125 is connected to the control electrode of an electron discharge device 128 and the opposite terminal is supplied with a source of bias by connection to the common terminal of voltage dividing resistances 129, 130, the resistor 129 being shunted by a capacitor 131. Operating potential for device 128 is provided through a decoupling network comprising resistor 132 connected to a source of positive potential and by-pass capacitor 133 connected to ground.

Device 128 operates as a cathode follower having a resistance 134, connected between the cathode and ground, to provide a low impedance source of signals of the frequency $$\frac{\omega_i}{2\pi}$$

to the cathodes of the diodes 1, 1'.

As explained in the discussion of the circuit of Fig. 2, the combination of resistor 14, capacitor 15 functions as a filter which permits only slow variations of potential on conductor 16. The operation of this filter circuit is stabilized by means of a network shunted across capacitor 15 and comprising resistor 135 and capacitor 136. Similarly, the networks comprising resistances 14', 137 and capacitors 15', 138 serve to provide a stabilized filtered unidirectional potential proportional to the carrier component of the signal supplied by device 128 to the cathodes of diodes 1, 1'. To this end, the unidirectional potential developed across capacitor 15' may be supplied to the radio frequency amplifier and mixer 33 and intermediate frequency amplifier 35 automatically to control the gain of these circuits in a conventional manner. In this network, resistor 137 and capacitor 138 connected across capacitor 15' provide a load circuit for diodes 1', 2' which is identical to that employed in the circuit of diodes 1, 2. The output currents of the exalted carrier detector are supplied by conductors 11, 11' to the $\alpha$ and $\beta$ networks 37, 38 as explained in the discussion of the system of Fig. 3.

One circuit for the differential amplifier 39 of my improved receiver is illustrated in Fig. 7 and comprises a pair of electron discharge devices 139, 140 having their cathodes connected to ground through a common resistance 141 and their anodes connected, respectively, to a source of unidirectional potential through equal resistances 142, 143. The output terminal of the $\alpha$ network 37 is coupled to the control electrode of device 139 through a capacitor 144 and the output terminal of the $\beta$ network 38 is coupled to the control electrode of the device 140 through a capacitor 145. The control electrodes are likewise connected, respectively, through equal resistances 146, 147 to the common terminal of voltage dividing resistances 148, 149, the latter resistance being by-passed to ground by a capacitor 150. The resistances 148, 149 are connected across the source of operating potential to supply desired bias potential to the control electrodes of the devices 139, 140.

In the operation of the differential amplifier in a conventional manner, the output terminal 151, coupled to the cathodes of devices 139 and 140, provides a signal which comprises the sum of the signals supplied by the $\alpha$ and $\beta$ networks. The equation of the sum of these two signals is that given by Equation 50 and consists solely of the intelligence $p$. On the other hand, the signal on terminal 152 coupled to the anode of device 140 comprises the difference between the signals of the outputs of the $\alpha$ and $\beta$ networks. This difference signal, the expression of which is given in Equation 51, consists solely of intelligence $q$.

In Fig. 8, I have shown an alternative circuit for the differential amplifier 39 which comprises a simple resistance mixing circuit. In Fig. 8, the output terminals 64, 65 of the $\alpha$ network 37 are connected, respectively, to corresponding ends of potentiometers 153, 154. The respective terminals 64, 65 are connected with the potentiometers 153, 154 through coupling capacitors 155 to keep the unidirectional currents in the outputs of the $\alpha$ and $\beta$ networks from flowing through the potentiometers.

The terminal 65 of the $\beta$ network 38 is coupled to the other terminals of these potentiometers. If the values of resistors 62 and 63 in the $\alpha$ and $\beta$ networks are those given previously in a table of values for the elements of the circuit of Fig. 4, the signal potentials on conductors 64, 65 are balanced to ground for both networks. Accordingly, by the connections shown in Fig. 8, a signal equal to the sum of the signals in the α and β networks, and which may comprise intelligence p only, may be obtained from tap 156 on potentiometer 154. A signal equal to difference of the signals in the outputs of the α and β networks, and which may comprise signals of q intelligence only, is available on the tap 157 of potentiometer 153. These taps 156, 157 are movable so that they provide a means for balancing or adjusting the signals supplied, respectively, to the amplifiers 40, 41.

In the system shown in block diagram in Fig. 3, the signals at the output of the pairs of α and β networks of the transmitter have constant amplitudes and, while their phase difference may vary slightly from 90° due to the fact that the α and β networks are not perfect networks, I have found that by suitably proportioning the values of the components of these networks this deviation from 90° phase relation may be made very small, the maximum deviation being of the order of 2° or less in translating a band of frequencies the maximum frequency of which is approximately 100 times the minimum frequency. In the system of Fig. 9, I have shown a modification of my selective sideband system in which the pair of voltages used for modulating a carrier wave are maintained exactly at a constant 90° phase difference but in which a slight variation in magnitude of these voltages may be encountered because of the imperfect α and β networks employed. The system of Fig. 9 is substantially the same as the system of Fig. 3 and elements thereof corresponding to elements of the system of Fig. 3 are indicated by corresponding reference numerals.

In the transmitter portion of the system of Fig. 9, a differential amplifier 158 is connected between the α and β networks 20, 21 and the modulators 24, 25. Another differential amplifier 159 is connected between the α and β networks 22, 23 and modulators 26, 27. The remaining elements of the transmitter are identical with those used in the system of Fig. 3. In the receiver, elements 33, 34 and 35 are similar to that shown in Fig. 6, wherein the output of I. F. amplifier 35 comprises modulated carrier waves at the new carrier frequency $$\frac{\omega_1}{2\pi}$$

produced as a result of heterodyning the oscillations of 34 with the incoming waves available over antenna 32 and including the upper and lower side bands bearing the intelligence of channels p and q. The detector 36 which is shown in Fig. 6 mixes the output of a local source of oscillation shown in block 4 of Fig. 6 with the upper and lower side bands transmitted from the immediate frequency of the amplifier 35 before application to the differential amplifier 160 shown in Fig. 9. The differential amplifier 160 is connected between the combined exalted carrier detectors 36 and the α and β networks 37, 38.

While the operation of the system of Fig. 9 may be explained by rigorous mathematical analysis similar to that employed in discussing the operation of the system of Fig. 3, I have chosen to explain the operation of the system of Fig. 9 by the vector diagrams shown in Figs. 10–15. Of course a similar vectorial analysis could be applied to the system of Fig. 3.

In Fig. 10, the vector bearing the legend $M_α$ may represent the voltage at the output of the α network 20 and the vector bearing the legend $M_β$ may represent the voltage at the output of the β network 21. Due to the imperfect characteristics inherent in such α and β networks, there two voltages, instead of being displaced in phase by exactly 90°, may vary from the 90° phase relationship by the angle δ, but will have exactly equal amplitudes. In the differential amplifier, the vector voltage $M_α$, $M_β$ are added to produce the voltage represented by the vector bearing the legend $M'\cos pt$. The vector voltage $M_β$ is subtracted from the voltage $M_α$ in this same amplifier to produce the vector voltage bearing the legend $M''\sin pt$. The voltage $M'\cos pt$ is displaced from the voltage $M''\sin pt$ by exactly 90°. However, the scalar magnitudes $M'$, $M''$ are not equal but vary by a small amount depending on the characteristics of the α and β networks through which they have passed.

The components of the voltage at the output of modulator 24 are shown in the vector diagram of Fig. 11. These components comprise the carrier wave $\cos \omega t$, the lower sideband signal $$\frac{M'}{2}\cos(\omega-p)t$$

and the upper sideband component $$\frac{M'}{2}\cos(\omega+p)t$$

If the modulator 24 comprises the circuit of Fig. 5, the carrier component $\cos \omega t$ does not appear in the output but is suppressed due to the operation of the modulator circuit. However, the carrier component is shown in Figs. 11–15 to establish a reference base for purposes of easy visualization. Moreover, in Figs. 11–15, the vector representing the carrier component is considered as stationary and the rotations of the other vectors relative to the carrier component only are considered. Of course, the rotation of the vectors representing the modulation components relative to the carrier component occurs at the modulation frequency.

In the modulator 25, the carrier wave $\sin \omega t$ is modulated by the vector voltage $M''\sin pt$ to produce and output voltage, the vector diagram of which is shown in Fig. 12. This voltage comprises a carrier component $\sin \omega t$ plus two equal and oppositely rotating modulation components comprising the lower sideband component $$\frac{M''}{2}\cos(\omega-p)t$$

and the upper sideband component $$\frac{M''}{2}\cos(\omega+p)t$$

Since, in the modulators 24, 25, the carrier waves are usually suppressed, we need consider only the sidebands present at the output of these modulators. Figs. 13 and 14 illustrate the resultant voltages when only the sidebands in the outputs of modulators 24, 25 are added. Fig. 13 shows the result of adding the two lower sideband $$\frac{M'}{2}\cos(\omega-p)t \text{ and } \frac{M''}{2}\cos(\omega-p)t$$

to produce a desired resultant sideband $$\frac{M''+M'}{2}\cos(\omega-p)t$$

The upper sideband components are 180° out of phase and, when added together, produce the vector voltage, illustrated in Fig. 14 by the small vector bearing the legend $$\frac{M'-M''}{2}\cos(\omega+p)t$$

This resultant voltage is an undesired voltage and arises because of the unequal magnitudes of the vector voltages $M'$, $M''$. The difference $\Delta M$ between these two voltages is given by the equation $M'-M''=\Delta M$.

The radiated signal including a carrier from the amplifier 29 may be illustrated by the vector shown in the left-hand portion of Fig. 15 and comprises the carrier component $\cos \omega t$, the desired lower sideband component $$\frac{M'+M''}{2}\cos(\omega-p)t$$

and the undesired component $$\frac{M'-M''}{2}\cos(\omega+p)t$$

This vector is identically equal to that shown in the right-hand portion of Fig. 15 in which the component voltages are given in terms of vectors $M''$ and $\Delta M$. Thus, the voltage as illustrated in the right-hand portion of Fig. 15, may be represented as comprising the carrier component $\cos \omega t$, the desired lower sideband component $M'' \cos(\omega-p)t$, and the undesired component made up of two oppositely rotating vectors having values equal, respectively, to $$\frac{\Delta M}{2}\cos(\omega-p)t \text{ and } \frac{\Delta M}{2}\cos(\omega+p)t$$

This right-hand vector diagram of Fig. 15 illustrates that the radiated signal includes not only a desired single sideband component but also undesired residual double sideband components of the specific phase relationship relative to the desired single sideband components shown in this vector diagram.

In the receiver, the output of one of the exalted carrier detectors 36 of the system of Fig. 9 is proportional to $(M''+\Delta M) \cos pt = M' \cos pt$. The output of the other detector is $M'' \sin pt$.

In the foregoing, of course, signals from the channel $p$ only have been considered. When signals from the channel $q$ likewise are considered, similar analysis shows that the radiated signal contains components $M_q'' \cos(\omega+q)t$ and undesired components $$\frac{\Delta M_q}{2}\cos(\omega+q)t$$

and $$\frac{\Delta M_q}{2}\cos(\omega-q)t$$

Assuming that the upper sideband is used as the principal sideband for the translation of the $q$ intelligence, it can be shown that the output of the one of the detectors 36 in the receiver, which for the $p$ intelligence provided the signal $M' \cos pt$, gives for the $q$ intelligence the signal $(M_q''+\Delta M_q) \cos qt = M_q' \cos qt$. The output of the other detector of the combined exalted carrier detectors 36 is $-M_q'' \sin qt$.

For either channel $p$ or $q$, the differential amplifier 160 in the receiver converts the $M'$ and $M''$ signals to $M_\beta$ and $M_\alpha$ signals so that the $\alpha$ and $\beta$ networks 37, 38 can provide ideal separation of the $p$ intelligence from the $q$ intelligence and supply the proper intelligence to the channel amplifiers 40, 41. It is obvious, of course, that, in the receiver of both Figs. 3 and 9, any desired switching arrangement may be employed for selecting either or both of the upper and lower sidebands to receive the intelligences translated by the selected sideband. Thus, such switching arrangements may be included in the differential amplifier 39 or between that amplifier and the channels 40, 41. Alternatively, both intelligences may be received simultaneously to produce binaural effects where the sources at the transmitter were exposed to the same sound field. Likewise, similar switching arrangements may be employed in the transmitters of the sources of Figs. 3 and 9 so that both sidebands may be transmitted simultaneously or any desired sideband may be transmitted alone, i. e., either the upper sideband or the lower sideband may be used by itself to transmit the desired intelligence signals.

An important advantage of the improved communication systems described above is that they permit simultaneous single sideband modulation of a radio frequency carrier by two sources of intelligence and reception of the resulting composite signal with apparatus which separates the two intelligence channels and provides an output of each on different pairs of terminals. Thus, the overall system may be used for multiplex transmission and reception of any two channels which may be any type of communication or entertainment without requiring, if the bandwidths of the two channels are the same, a greater bandwidth than that required for either channel alone when conventional double sideband transmission and reception are employed.

In the transmitters of the systems disclosed in Figs. 3 and 9, binaural signals may be radiated, which signals may be received by conventional receivers now in use and translated by these receivers in their normal fashion. On the other hand, these signals may be received by a binaural receiver to produce binaural effects in the output thereof. The binaural receivers described above, moreover, employ no expensive filters, so that they are relatively simple in operation and inexpensive in construction. It is thus apparent that by my invention it is possible to have a radio broadcasting arrangement in which both normal single channel transmitters and double single sideband transmitters may be operated. Either conventional receivers or my improved receiver circuits may be employed to produce, respectively, conventional reception effects or binaural effects. Thus, the systems disclosed permit a transition from the present broadcasting system to a new and improved arrangement without obsoleting existing equipment in the sense that such existing equipment is made useless during such transition.

It is apparent likewise that, in my improved system, since no filters are employed, the circuit arrangements are not limited by considerations normally encountered when filters are used; that is, the transmitters may utilize both very low and very high modulation frequencies and the receivers produce faithful reproduction of all such modulation frequencies.

In my improved transmitters, when the two intelligence channels are made identical, it is apparent that the two sidebands may be made to bear the same phase relations relative to the carrier as those produced by a conventional amplitude modulation transmitter. In other words, the radiated signal in such a case is identical with that radiated by a conventional transmitter and may be received by a conventional radio receiver. My improved receiver circuits employing the combined multi-carrier detectors operate to receive both sidebands simultaneously or either sideband, as desired. Thus, if interference is encountered on one side-band and not on the other, the operator of the receiver may select the sideband having no interference. In addition, two sidebands may be transmitted with any desired phase shift relative to each other or to the carrier wave.

Another important advantage of my invention is that the receiver described above may be used for single sideband reception of double sideband transmissions with the result that an interfering channel on one side or the other of the desired signal may be eliminated from the output and the effects of selective fading so frequently encountered in conventional receivers are greatly reduced. By the use of the combined exalted carrier detection circuits of my receiver, reception of either single sideband transmission or double sideband transmission may be obtained with virtual elimination of the distortion caused by selective fading in the transmission path.

In addition, I have found that my improved receiver circuits are particularly well adapted for the reception of double sideband signals in which the sidebands are shifted 90° in phase with respect to the carrier from that phase which usually characterizes amplitude modulation signals. A signal of this type is commonly referred to as "narrow band" phase modulation and is employed in many radio transmitters. Such a signal is received to better advantage with my improved circuits than those commonly used today.

While certain specific embodiments have been shown and described, it will of course be understood that various modifications may be made without departing from the invention. The appended claims are, therefore, intended to cover any such modifications coming within the true spirit and scope of the invention.

What I claim as new and desire to secure by Letters Patent of the United States is:

1. A communication system including a transmitter and a receiver, said transmitter comprising means including a plurality of devices subjected to the influence of the same sound field, each of said devices producing signals in a different sideband range, said receiver comprising means for phase shifting each of said last-named signals a different amount, and a plurality of balancing means for combining differently said phase shifted signals simultaneously to reproduce therefrom further signals substantially re-establishing said sound field.

2. A communication system including a transmitter and a receiver, said transmitter comprising a plurality of devices subjected to the influence of the same sound field for producing different signals therefrom, respective network means utilizing each of said different signals for producing therefrom a pair of signals corresponding frequency components of which are displaced in phase by substantially the same angle, two sources of carrier waves of the same frequency and displaced in phase by said angle, means utilizing one of said pairs of signals and the waves from one source to produce an upper sideband related to said waves and the other pair of signals and the waves from the other source to produce a lower sideband related to said carrier waves, means in said receiver for processing said sidebands to produce another pair of signals each containing both signals with different phase relationship, and additive and subtractive means simultaneously for reproducing said different signals from said other pair of signals in said receiver.

3. In combination, a pair of pickup devices subjected to the same sound field, respective pairs of identical networks for shifting the phase of the output signal of each of said devices to form therefrom two pairs of signals, corresponding frequency components of each of said pairs of signals being displaced in phase by substantially 90°, two sources of carrier waves of the same frequency and displaced in phase substantially by 90°, each network from one of the pairs of networks being arranged to provide the same time delay for corresponding frequency components of the signals being phase shifted thereby as a respective one of the networks of the other pair of networks, and means utilizing one pair of said two pairs of signals in conjunction with carrier waves from one of said sources of carrier waves to produce an upper sideband associated with said wave and the other pair in conjunction with waves from the other of said sources of carrier waves to produce a lower sideband.

4. A receiver for selectively responding on different pairs of output terminals to high frequency bands of energy having frequencies higher and lower respectively than a predetermined frequency, the response on one pair of said pair of terminals corresponding to received energy of frequencies greater than said predetermined frequency and the response on the other pair of said pairs of terminals corresponding to received energy of frequencies less than said predetermined frequency, said receiver comprising detecting means for producing two signal voltages from received high frequency energy, means for shifting the phase of said signal voltages to produce from each related signals, like frequency components of which are substantially in phase at the respective outputs of said phase shifting means when produced by one of said high frequency bands of energy and are displaced in phase by an angle of substantially 180° when produced by the other of said high frequency bands of energy, and additive and subtractive means connected to said last means for producing on a first of said pairs of output terminals output signals corresponding to received energy of frequencies greater than said predetermined frequency and on the other of said pairs of output terminals output signals corresponding to received energy of frequencies less than said predetermined frequency.

5. A communication system including a transmitter and a receiver comprising means for producing upper and lower sidebands with reference to the carrier wave of said transmitter and each bearing a respective intelligence, said transmitter comprising separate channels for said respective intelligences, each of said channels including network means for producing two signals comprising the components of one of said respective intelligences, corresponding frequency components of each of said signals being displaced in phase by substantially the same angle, demodulating means in said receiver for producing two different signals each containing the intelligences of both of said channels, and additive and subtractive means for combining said last two signals simultaneously to reproduce said respective intelligences on separate output terminals.

6. A communication system including a transmitter and a receiver, said transmitter comprising means for producing upper and lower sidebands with reference to the carrier wave of said transmitter, each of said sidebands bearing respective intelligences, said transmitter comprising separate channels for said respective intelligences, each of said channels including network means for producing two signals comprising the components of one of said respective intelligences, corresponding frequency components of each of said signals being displaced in phase by substantially the same angle, demodulating means in said receiver for producing two signals each containing the intelligences of both of said channels, and additive and subtractive means for selectively combining said last two signals to reproduce a desired one of said intelligences.

7. A communication system for two intelligences including a transmitter and a receiver, said transmitter comprising a source of carrier waves and means for producing upper and lower sidebands, each bearing a respective intelligence with reference to the carrier wave of said transmitter, said means comprising separate channels for said respective intelligences, each of said channels including network means for producing a pair of signals comprising the components of a respective intelligence, corresponding frequency components of each of said signals in each pair being displaced in phase by substantially the same angle, and means in said receiver for demodulating said side bands, means for phase shifting said demodulated sidebands, and separate means for adding and subtracting said phase shifted demodulated sidebands for reproducing said two intelligences.

8. A double single sideband transmitter comprising a pair of input channels, networks connected to each of said channels for shifting the phase of the signals thereof substantially logarithmically with frequency to form two voltages, like frequency components of which are displaced in phase by substantially the same angle, a source of carrier wave, means for modulating said carrier wave with one of said voltages, means for shifting the phase of said carrier wave by a predetermined angle, means for modulating said phase-shifted carrier wave with the other of said voltages, and means for combining the pairs of modulations of both said channels to produce a carrier wave having an associated upper sideband bearing the signal of one of said input channels and a lower sideband bearing the signal of the other input channel, and means for controlling the intensity of said carrier waves relative to the intensity of said side bands.

9. A double single sideband transmitter comprising a pair of input channels, networks connected to each of said channels for shifting the phase of the signals thereof substantially logarithmically with frequency to form two voltages, like frequency components of which are displaced in phase by substantially 90°, a source of carrier wave, means for modulating said carrier wave with one of said voltages, means for shifting the phase of said carrier wave by substantially 90°, means for modulating said phase shifted carrier wave with the other of said voltages, means for combining the pairs of modulations of both said channels to produce a carrier wave having associated therewith an upper sideband bearing the signal of one of said input channels and a lower sideband bearing the signal of the other input channel, and means for controlling the intensity of said carrier wave relative to the intensity of said sidebands.

10. A receiver for two frequency adjacent signals, each signal bearing a respective intelligence, comprising detecting means for producing two signal voltages from said adjacent signals, means for shifting the phase of each of said two signal voltages to produce from each another voltage, like frequency components of said other voltages being substantially in phase when produced from one of said signals and displaced in phase by substantially 180° when produced from the other of said signals, and differential means for reproducing in separate output circuits said respective intelligences from said other voltages.

11. A receiver for two frequency adjacent signals, each signal bearing a respective intelligence, comprising detecting means for producing two signal voltages from said adjacent signals, means for shifting the phase of each of said two signal voltages to produce from each another voltage, like frequency components of said other voltages being substantially in phase when produced from one of said signals and displaced in phase by substantially 180° when produced from the other of said signals, and means utilizing said voltages for selectively reproducing the desired one of said intelligences.

12. A receiver for two frequency adjacent signals, each signal bearing a respective intelligence, comprising detecting means for producing two signal voltages from said adjacent signals, means for shifting the phase of each of said two signal voltages to produce from each another voltage, like frequency components of said other voltages being substantially in phase when produced from one of said signals and displaced in phase by substantially 180° when produced from the other of said signals, and means for combining said voltages to reproduce one of said signals.

13. A receiver for two sidebands, each sideband bearing a respective intelligence comprising means including a pair of detectors for producing a pair of voltages, phase-shifting means connected to said detectors for producing from said pair of voltages another pair of voltages, like frequency components of said other pair of voltages being substantially in phase when produced from one of said sidebands and displaced in phase by substantially 180° when produced from the other of said sidebands, differential means having a pair of input terminals connected respectively to different of said phase-shifting means and two pairs of output terminals, one of said intelligences appearing on one of said pairs of output terminals and the other of said intelligences appearing on the other of said pairs of output terminals.

14. A receiver for two sidebands, each sideband bearing a respective intelligence comprising means including a pair of detectors for producing a pair of voltages, phase-shifting means connected to said detectors for producing from said pair of voltages another pair of voltages, like frequency components of said other pair of voltages being substantially in phase when produced from one of said sidebands and displaced in phase by substantially 180° when produced from the other of said sidebands, and means including differential means having a pair of input terminals connected respectively to different of said phase-shifting means for reproducing a desired one of said intelligences.

15. An exalted carrier detector for a signal modulated wave comprising two pairs of rectifiers, each rectifier having first and second electrodes, means for supplying said signal modulated wave to the first electrode of a first rectifier of each said pairs, means for supplying to the second electrodes of a first pair of said rectifiers an unmodulated wave of the same frequency and of greater amplitude than said modulated wave, means for supplying to the second electrodes of the other pair of rectifiers a wave having a predetermined phase difference from the wave supplied to the second electrodes of said first pair of rectifiers, all of said rectifiers having substantially equal impedances which provide a direct current path connected between the electrodes thereof, and output terminals connected to the first electrodes of the other rectifier of each of said pairs.

16. An exalted carrier detector for a signal modulated wave comprising two pairs of rectifiers, each rectifier having first and second electrodes, means for supplying said signal modulated wave to the first electrode of a first rectifier of each of said pairs, means for supplying to the second electrodes of a first pair of said rectifiers an unmodulated wave of the same frequency and of greater amplitude than said modulated wave, means for supplying to the second electrodes of the other pair of rectifiers a wave having a predetermined phase difference from the wave supplied to the second electrodes of said first pair of rectifiers, a first pair of equal resistances connected respectively between the electrodes of the other rectifier of each of said pairs, a second pair of resistances equal to said first resistances connected respectively between the second electrodes of the first rectifiers of each of said pairs and a point of fixed potential, and output terminals connected to the first electrodes of said other rectifier of each of said pairs.

17. An exalted carrier detector for a signal modulated wave comprising two pairs of rectifiers, each rectifier having first and second electrodes, means for supplying said signal modulated wave to a first electrode of a first rectifier of each of said pairs, means for supplying to the second electrodes of a first pair of said rectifiers a second wave of greater amplitude than said first wave, means for supplying to the second electrodes of the other pair of rectifiers a wave having a phase difference of 90° from said second wave, all of said rectifiers having substantially equal impedances which provide a direct path connected in circuit between the electrodes thereof, and output terminals connected to the first electrodes of the other rectifier of each of said pairs.

18. An exalted carrier detector for a signal modulated wave comprising two pairs of rectifiers, each rectifier having first and second electrodes, means for supplying said signal modulated wave to a first electrode of a first rectifier of each of said pairs, means for supplying to the second electrodes of a first pair of said rectifiers a second wave of the same frequency and of greater amplitude than said first wave, means for supplying to the second electrodes of the other pair of rectifiers a wave having a phase difference of 90° from said second wave, all of said rectifiers having substantially equal impedances which provide a direct current path connected in circuit between the electrodes thereof, and output terminals connected to the first electrodes of the other rectifier of each of said pairs.

19. An exalted carrier detector for a signal modulated wave comprising two pairs of rectifiers, each rectifier having first and second electrodes, means for supplying said signal modulated wave to a first electrode of a first rectifier of each of said pairs, means for supplying to the second electrodes of a first pair of said rectifiers a second wave of greater amplitude than said first wave, means for supplying to the second electrodes of the other pair of rectifiers a wave having a predetermined phase difference from said second wave, all of said rectifiers having substantially equal impedances which provide a direct current path connected in circuit between the electrodes thereof, and output terminals connected to the first electrodes of the other rectifier of each of said pairs.

20. An exalted carrier detector for a signal modulated wave comprising two pairs of rectifiers, each rectifier having first and second electrodes, means for supplying said signal modulated wave to the first electrode of a first rectifier of each of said pairs, means for supplying to the second electrodes of a first pair of said rectifiers an unmodulated wave of the same frequency and of greater amplitude than said modulated wave, means for supplying to the second electrodes of the other pair of rectifiers a wave having a predetermined phase difference from the wave supplied to the second electrodes of said first pair of rectifiers, all of said rectifiers having equal impedances which provide a direct current path connected between the electrodes thereof, output terminals connected to the first electrodes of the other rectifier of each of said pairs, and means coupled to the output terminal of said first pair of rectifiers for maintaining synchronism between said modulated and unmodulated waves.

21. An exalted carried detector for a signal modulated wave comprising two pairs of rectifiers, each rectifier having first and second electrodes, means for supplying said signal modulated wave to a first electrode of a first rectifier of each of said pairs, means for supplying to the second electrodes of a first pair of said rectifiers a second wave of the same frequency and of greater amplitude than said first wave, means for supplying to the second electrodes of the other pair of rectifiers a wave having a phase difference of 90° from said second wave, all of said rectifiers having substantially equal impedances which provide a direct current path connected in circuit between the electrodes thereof, output terminals connected to the first electrodes of the other rectifier of each of said pairs, and means utilizing a voltage derived from one of said output terminals for maintaining synchronism between said modulated wave and said second wave.

22. An exalted carrier detector for a signal modulated carrier wave comprising two pairs of rectifiers, each rectifier having first and second electrodes, means for supplying said signal modulated wave to a first electrode of a first rectifier of each of said pairs, means for supplying to the second electrodes of a first pair of said rectifiers a second wave of the same frequency and of greater amplitude than said modulated wave, means for supplying to the second electrodes of the other pair of rectifiers a wave having a phase difference of 90° from said second wave, all of said rectifiers having equal impedances which provide a direct current path connected between the electrodes thereof, output terminals connected to the first electrodes of the other rectifier of each of said pairs, and means coupled to the output terminal of the first pair of rectifiers for maintaining synchronism between said modulated and second waves.

23. A double single sideband transmitter comprising two sources of oscillations of the same frequency and displaced in phase by 90°, two modulating channels each comprising a source of intelligence, means for producing from each of said sources a pair of signals, corresponding frequency components of which are displaced in phase substantially by the same angle, additive and substractive means responsive to each pair of signals for producing two voltages displaced in phase by 90°, and means for modulating the oscillations from the respective sources with a different one of said voltages, said voltages of said modulating channels being so related that the intelligence source of one of said channels appears as an upper sideband of said oscillations and the intelligence source of the other of said channels appears as a lower sideband of said oscillations.

24. A single sideband transmitter comprising two sources of oscillations of the same frequency and displaced in phase by 90°, a modulating channel comprising a source of intelligence, means for producing from said source of intelligence a pair of signals corresponding frequency components of which are displaced in phase substantially by the same angle, additive and subtractive means for producing from said pair of signals two voltages displaced in phase by 90°, and means for modulating the oscillations from the respective sources with different of said voltages to produce a sideband of said oscillations.

25. A demodulator for a modulated wave comprising two pairs of rectifiers each having first and second electrodes, means for supplying said modulated wave to the first electrode of one of the rectifiers of each of said pairs, output terminals connected to corresponding first electrodes of the other rectifier of each of said pairs, means for supplying to the second electrodes of one of said pairs of rectifiers a locally generated wave, impedance means for providing a direct current path connected between the first and second electrodes of each of said rectifiers, means for shifting the phase of said locally generated wave through an angle of 90°, and means for supplying said shifted wave to corresponding second electrodes of the other of said pairs of rectifiers.

26. A demodulator for a modulated wave comprising two pairs of rectifiers each having first and second electrodes, means for supplying said modulated wave to the first electrode of one of the rectifiers of each of said pairs, output terminals connected to corresponding first electrodes of the other rectifier of each of said pairs, means for supplying to the second electrodes of one of said pairs of rectifiers a locally generated wave of the same frequency as said modulated wave, impedance means for providing a direct current path connected between the first and second electrodes of each of said rectifiers means for shifting the phase of said modulated wave through an angle of 90°, and means for supplying said shifted wave to corresponding second electrodes of the other of said pairs of rectifiers.

27. A demodulator for modulated waves comprising two pairs of rectifiers each having first and second electrodes, means for supplying said modulated waves to a first electrode of one of the rectifiers of each of said pairs, output, circuits connected to corresponding first electrodes of the other rectifier of each of said pairs of rectifiers, a source of unmodulated waves of the same frequency as said modulated waves, means for supplying to second electrodes of one of said pairs of rectifiers said unmodulated waves, means for shifting the phase of said unmodulated waves through an angle of 90°, means for supplying said shifted waves to corresponding second electrodes of the other of said pairs of rectifiers, and means responsive to the output developed across one of said ouput circuits for controlling the frequency of said unmodulated waves to maintain synchronism between said modulated and unmodulated waves.

28. In a demodulator for signal modulated waves, a pair of rectifiers, means for supplying said waves to a first electrode of one of said rectifiers, an output circuit connected to a corresponding electrode of the other of said rectifiers, a source of unmodulated waves of the same frequency as said modulated waves, means for supplying to a second electrode of both of said rectifiers said unmodulated waves, and means responsive to the output developed across said output circuit for maintaining a substantially constant phase difference between said modulated and unmodulated waves.

29. An exalted carrier detector for a signal modulated wave, said detector having a pair of input circuits and an output circuit, means for supplying said modulated wave to one of said input circuits, means for supplying to the other of said input circuits an unmodulated wave, and means responsive to the output developed across said output circuit for synchronizing said unmodulated wave with said modulated wave.

30. An exalted carrier detector for a signal modulated wave, said detector having a pair of input circuits and an output circuit, means for supplying said modulated wave to one of said input circuits, means for supplying to the other of said input circuits an unmodulated wave of the same frequency as said modulated wave, and means responsive to the output developed across said output circuit for maintaining a substantially constant phase angle between said modulated and unmodulated waves.

31. A double single sideband transmitter comprising two sources of high frequency oscillations of the same frequency and displaced in phase by 90°, two sources of modulating signals, phase shifting means for shifting the phase of said modulating signals logarithmically with frequency to produce two voltages from each of said sources of signals, corresponding frequency components of the voltages associated with each modulating source being displaced 90° apart in phase, two pairs of modulators, means for supplying to a first modulator of each of said pairs oscillations from one of said sources and a first of the voltages and to the second modulator of each of said pairs oscillations from the other of said sources and the other of said voltages, said modulators having their output connected together to produce two sidebands, said phase shifting means being such that corresponding components in said sidebands are delayed in time by the same amount upon passage through said phase shifting means.

32. A communication system including a transmitter and a receiver, said transmitter comprising means including a pair of devices subjected to the influence of the same sound field, each component frequency of said field as presented to one of said devices bearing a predetermined phase relation to the same component frequency as presented to the other of said devices, each of said devices producing signals in a different sideband range of said transmitter, demodulating means in said receiver for simultaneously producing two separate signals from said sidebands, and additive and subtractive means responsive to said produced signals for providing a pair of output signals substantially to re-establish said sound field, each component frequency of one of said output signals bearing said predetermined phase relation to the same component frequency of the other of said output signals.

33. A receiver for two frequency adjacent signals, each signal bearing a respective intelligence, comprising detecting means for producing two signal voltages from said adjacent signals, differential means for combining said voltages to produce therefrom two derived voltages, means for shifting the phase of each of said two derived voltages to produce from each another voltage, like frequency components of said other voltages being substantially in phase when produced from one of said signals and displaced in phase by substantially 180° when produced from the other of said signals, and differential means simultaneously for reproducing in separate output circuits said respective intelligences from said other voltages.

34. A receiver for two frequency adjacent signals, each signal bearing a respective intelligence, comprising detecting means for producing two signal voltages from said adjacent signals, differential means for combining said voltages to produce therefrom two derived voltages, means for shifting the phase of each of said two derived voltages to produce from each another voltage, like frequency components of said other voltages being substantially in phase when produced from one of said signals and displaced in phase by substantially 180° when produced from the other of said signals, and means utilizing said other voltages for selectively reproducing the desired one of said intelligences.

35. A receiver for signals bearing an intelligence, comprising detecting means for producing two signal voltages from said received signals, differential means for combining said voltages to produce therefrom two derived voltages, means for shifting the phase of each of said two derived voltages to produce from each another voltage, like frequency components of said other voltages being substantially in phase or in phase opposition, and means utilizing said other voltages for reproducing said intelligence.

36. A receiver for reproducing signals bearing a desired intelligence in a sideband range, while excluding signals occurring in an adjacent sideband range, comprising means for producing two signal voltages from said signals, differential means for combining said voltages to produce therefrom two derived voltages, means for shifting the phase of each of said two derived voltages to produce from each another voltage, like frequency components of said other voltages being substantially in phase when produced from one of said signals and displaced in phase by substantially 180° when produced from the other of said signals, and means utilizing said other voltages to reproduce substantially only said desired intelligence.

37. A selective sideband system comprising two sources of carrier waves of the same frequency and having a phase displacement other than integral multiples of $\pi$ radians including zero, two sources of modulating waves, each comprising a plurality of frequencies, one pair of networks for phase shifting the modulating waves from one of said sources to provide a pair of modulating waves having corresponding frequency components phase displaced by 180° plus said carrier phase displacement, a second pair of networks for phase shifting the modulating waves from the other of said sources to provide another pair of modulating waves having corresponding frequency components phase displaced by 180° minus said carrier phase displacement, means for modulating the waves from one carrier source with one of the modulating waves from each pair, means for modulating the waves from the other carrier source with the other modulating waves of each pair, and means for separately combining the outputs of said modulating means to provide an upper sideband containing components from only one of said modulating wave sources, and a lower sideband containing components from only the other of said modulating wave sources.

38. A selective sideband system comprising two sources of carrier waves of the same frequency and having a phase displaceemnt other than integral multiples of $\pi$ radians including zero, two sources of modulating waves, each comprising a plurality of frequencies, one pair of networks for phase shifting the modulating waves from one of said sources to provide a pair of modulating waves having corresponding frequency components phase displaced by 180° plus said carrier phase displacement, a second pair of networks for phase shifting the modulating waves from the other of said sources to provide another pair of modulating waves having corresponding frequency components phase displaced by 180° minus said carrier phase displacement, respective differential means responsive to each pair of modulating waves for providing separate sum and difference components thereof, means for modulating the waves from one carrier source with one of the components from each differential means, means for modulating the waves from the other carrier source with the other component of each differential means, and means for separately combining the outputs of said modulating means to provide an upper sideband containing components from only one of said modulating wave sources, and a lower sideband containing components from only the other of said modulating wave sources.

39. A communication system for sound signals available from a given source comprising a transmitter, said transmitter comprising a plurality of spaced electro-acoustic pick-up elements for receiving the sound signals emanating from said source with a given relative phase relation between corresponding frequencies dependent upon said spacing, means including phase shift apparatus for transducing the output signals of each of said elements to a different sideband range with respect to a reference carrier frequency, said means introducing a predetermined change in said relative phase relations, a receiver comprising a plurality of means responsive to said sidebands for introducing compensating changes in the relative phase relations of the transduced signals contained in said sidebands simultaneously to reproduce said sound signals with said given phase relations.

DONALD E. NORGAARD.

REFERENCES CITED

The following references are of record in the file of this patent:

UNITED STATES PATENTS

| Number | Name | Date |
|---|---|---|
| 1,583,004 | Osborne | May 4, 1926 |
| 1,608,566 | Potter | Nov. 30, 1926 |
| 1,666,158 | Affel | Apr. 17, 1928 |
| 1,685,357 | Griggs | Sept. 25, 1928 |
| 1,717,064 | Rettenmeyer | June 11, 1929 |
| 1,773,116 | Potter | Aug. 19, 1930 |
| 1,797,317 | Brand et al. | Mar. 24, 1931 |
| 1,854,247 | Brand | Apr. 19, 1932 |
| 1,957,269 | Hund | May 1, 1934 |
| 2,053,014 | Walton | Sept. 1, 1936 |
| 2,075,071 | Usselman | Mar. 30, 1937 |
| 2,227,902 | Hahnle | Jan. 7, 1941 |
| 2,256,317 | Earp | Sept. 16, 1941 |
| 2,403,957 | Seeley | July 16, 1946 |
| 2,413,396 | Weagant | Dec. 31, 1946 |
| 2,416,330 | Labin | Feb. 25, 1947 |
| 2,491,918 | Deboer | Dec. 20, 1949 |